US012001126B2

(12) United States Patent
Hong

(10) Patent No.: US 12,001,126 B2
(45) Date of Patent: Jun. 4, 2024

(54) FOLDED MODULE AND CAMERA MODULE INCLUDING THE SAME

(71) Applicant: SAMSUNG ELECTRO-MECHANICS CO., LTD., Suwon-si (KR)

(72) Inventor: Jong Woo Hong, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 176 days.

(21) Appl. No.: 17/354,065

(22) Filed: Jun. 22, 2021

(65) Prior Publication Data

US 2022/0066291 A1   Mar. 3, 2022

(30) Foreign Application Priority Data

Sep. 2, 2020  (KR) .................. 10-2020-0111940

(51) Int. Cl.
  *G03B 17/17*   (2021.01)
  *G02B 7/182*   (2021.01)
  *G02B 13/00*   (2006.01)
  *G02B 27/64*   (2006.01)

(52) U.S. Cl.
  CPC .......... *G03B 17/17* (2013.01); *G02B 7/1821* (2013.01); *G02B 13/0065* (2013.01); *G02B 27/646* (2013.01)

(58) Field of Classification Search
  CPC .. G03B 17/17; G02B 13/0065; G02B 7/1821; G02B 27/646
  See application file for complete search history.

(56) References Cited

U.S. PATENT DOCUMENTS

| 10,416,472 | B2 | 9/2019 | Jeong et al. |
| 10,866,430 | B2 | 12/2020 | Kim et al. |
| 2012/0147258 | A1 | 6/2012 | Park |
| 2018/0217475 | A1 | 8/2018 | Goldenberg et al. |
| 2018/0231793 | A1 | 8/2018 | Jeong et al. |
| 2018/0329276 | A1* | 11/2018 | Hu .......... G03B 17/17 |
| 2018/0367714 | A1 | 12/2018 | Im et al. |
| 2019/0129197 | A1* | 5/2019 | Kim ............ G02B 27/646 |

(Continued)

FOREIGN PATENT DOCUMENTS

| CN | 107533273 A | 1/2018 |
| CN | 108427235 A | 8/2018 |

(Continued)

OTHER PUBLICATIONS

Korean Office Action dated Apr. 11, 2022, in the counterpart Korean Patent Application No. 10-2020-0111940. (8 pages in English and 5 pages in Korean).

(Continued)

*Primary Examiner* — Cara E Rakowski
(74) *Attorney, Agent, or Firm* — NSIP Law

(57) ABSTRACT

A folded module includes a housing, a reflecting unit supported on an inner surface of the housing and including a reflective member, and a driving unit configured to provide driving force to rotate the reflecting unit with respect to the housing. The driving unit includes a first magnet and a second magnet disposed on the reflecting unit to face the inner surface, and at least one coil disposed in the housing and facing the first magnet and/or the second magnet.

20 Claims, 15 Drawing Sheets

(56) References Cited

U.S. PATENT DOCUMENTS

2020/0137274 A1    4/2020  Lee et al.
2021/0208363 A1*  7/2021  Kuo .................. H02K 41/0356
2021/0294184 A1*  9/2021  Kim ....................... G03B 30/00
2021/0364729 A1*  11/2021  Lee ....................... G03B 30/00

FOREIGN PATENT DOCUMENTS

| | | | |
|---|---|---|---|
| CN | 109725474 A | 5/2019 | |
| JP | 2015-114615 A | 6/2015 | |
| KR | 10-2012-0066264 A | 6/2012 | |
| KR | 10-2018-0003539 A | 1/2018 | |
| KR | 10-2018-0094355 A | 8/2018 | |
| KR | 10-2018-0137277 A | 12/2018 | |
| KR | 10-2019-0061439 A | 6/2019 | |
| KR | 10-2019-0072690 A | 6/2019 | |
| KR | 10-2019-0129798 A | 11/2019 | |
| KR | 10-2020-0047275 A | 5/2020 | |
| WO | WO 2017/208090 A1 | 12/2017 | |
| WO | WO-2019045439 A1 * | 3/2019 | ............. G02B 7/023 |
| WO | WO-2020135466 A1 * | 7/2020 | ........... G02B 27/646 |

OTHER PUBLICATIONS

Korean Office Action dated Sep. 29, 2021, in counterpart Korean Patent Application No. 10-2020-0111940 (8 pages in English and 5 pages in Korean).
Chinese Office Action issued on Mar. 27, 2024, in counterpart Chinese Patent Application No. 202110966939.3 (6 pages in English, 12 pages in Chinese).

* cited by examiner

FOLDED MODULE AND CAMERA MODULE INCLUDING THE SAME

CROSS-REFERENCE TO RELATED APPLICATIONS

This application claims the benefit under 35 USC 119(a) of Korean Patent Application No. 10-2020-0111940 filed on Sep. 2, 2020, in the Korean Intellectual Property Office, the entire disclosure of which is incorporated herein by reference for all purposes.

BACKGROUND

1. Field

The present disclosure relates to a folded module and a camera module including the same.

2. Description of the Background

Recently, cameras have been standardly installed in portable electronic devices such as tablet personal computers (PCs), notebooks, or the like, as well as smartphones. As video content production or personal broadcasting using the cameras provided in portable devices increases, the cameras of the portable devices are designed to provide autofocusing functions, folded functions, and zoom functions.

In order to improve the zoom functions, a camera module provided in a mobile terminal may include a folded module that reflects and/or refracts light using a reflective member and/or a refractive member (hereinafter referred to as "reflective member"). As referred to herein, "refraction," "refracts," "refractive," "refracting," and the like can be used interchangeably with "reflection," "reflects," "reflective," "reflecting," and the like, respectively, unless the context clearly indicates otherwise. The folded module may provide a function of refracting light using the reflective member and a folded function by tilting the reflective member. At this time, the reflective member may be driven by a voice coil motor (VCM). For example, the reflective member may be tilted with respect to a housing due to electromagnetic interaction between a driving magnet provided in the reflective member and a driving coil provided in the housing.

However, in order to implement various functions, a structure of the camera module has become complicated and a size of the camera module has been increased, resulting in an increase in a size of the portable electronic device in which the camera module is mounted. In particular, in the electronic device, a problem in which a portion in which the camera module is disposed protrudes further than other portions may occur.

Meanwhile, in an electronic device having the folded module, a magnetic member may be disposed in a portion of the folded module close to an optical image stabilizer (OIS) driving magnet. In this case, an OIS function may not be smoothly performed due to interaction between the magnetic member and the driving magnet. Therefore, it is advantageous that the OIS driving magnet be disposed in a position that may avoid interference with the magnetic member and which may be disposed around the folded module as much as possible.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a folded module includes a housing, a reflecting unit supported on an inner surface of the housing and including a reflective member, and a driving unit configured to provide driving force to rotate the reflecting unit with respect to the housing, wherein the driving unit includes a first magnet and a second magnet disposed on the reflecting unit to face the inner surface, and at least one coil disposed in the housing and facing the first magnet and/or the second magnet.

The second magnet may be positioned opposite to the first magnet about a rotation axis of the reflecting unit with respect to the housing.

The at least one coil may include a first coil facing the first magnet and a second coil facing the second magnet.

The at least one coil may include a coil facing both the first magnet and the second magnet.

The folded module may further include a first magnetic member disposed on the housing, and a second magnetic member disposed on the reflecting unit and facing the first magnetic member, wherein the reflecting unit may be supported on the inner surface of the housing by magnetic attraction arising between the first magnetic member and the second magnetic member.

The second magnetic member may include the first magnet and/or the second magnet.

A surface of the first magnet facing the at least one coil may have a polarity opposite to a surface of the second magnet facing the at least one coil.

The reflecting unit may include a rotating holder accommodating the reflective member, and a rotating plate disposed between the housing and the rotating holder, and the first magnet and the second magnet may be disposed on the rotating plate.

The folded module may further include a third magnetic member disposed on the rotating holder, and a fourth magnetic member disposed on the rotating plate, wherein magnetic attraction arises between the third magnetic member and the fourth magnetic member.

A camera module may include a camera housing having an inner space, the folded module disposed in the inner space, and a lens module aligned in an optical axis direction so that light reflected by the reflective member is incident, including at least one lens barrel having a plurality of lenses, and configured to allow the lens barrel to selectively move along an optical axis.

In another general aspect, a folded module includes a housing, a reflecting unit supported on the housing and including a reflective member, and a driving unit configured to provide driving force so that the reflecting unit moves with respect to the housing, wherein the driving unit includes a first driving element disposed in the reflecting unit, and a second driving element disposed in the housing to face the first driving element, and wherein the first driving element and the second driving element are substantially opposite to each other in a direction in which light is reflected and emitted by the reflective member.

The first driving element may include a first magnet and a second magnet, and wherein the second magnet may be positioned opposite to the first magnet about a rotation axis of the reflecting unit with respect to the housing.

The second driving element may include a first coil facing the first magnet and a second coil facing the second magnet.

The second driving element may include a coil facing both the first magnet and the second magnet.

The folded module may further include a magnetic member disposed on the housing, wherein the reflecting unit is supported on an inner surface of the housing by magnetic attraction arising between the magnetic member and the first driving element.

The reflecting unit may include a rotating holder accommodating the reflective member, and a rotating plate disposed between the housing and the rotating holder, and wherein the first driving element is disposed on the rotating plate.

A camera module may include a camera housing having a cover disposed on the housing to cover an internal space, the folded module may be disposed in the internal space to emit light incident through an opening in the cover, and a lens module having at least one lens barrel having a plurality of lenses aligned along an optical axis disposed so that the emitted light is incident thereto, wherein the lens barrel is configured to selectively move along the optical axis.

In another general aspect, a camera module includes a reflective member rotatable and configured to redirect incident light to an optical axis direction of lenses in a lens barrel, a coil and a magnet disposed to face each other in the optical axis direction, wherein magnetic force generated between the coil and the magnet rotates the reflective member about a first rotation axis substantially perpendicular to the optical axis direction.

The magnet may include two magnets disposed opposite to each other about the rotation axis.

The camera module may further include a rotating plate disposed between the reflective member and at least one of the coil and the magnet, wherein the reflective member is rotatable relative to the rotating plate about a second rotation axis substantially perpendicular to the first rotation axis and the optical axis direction.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
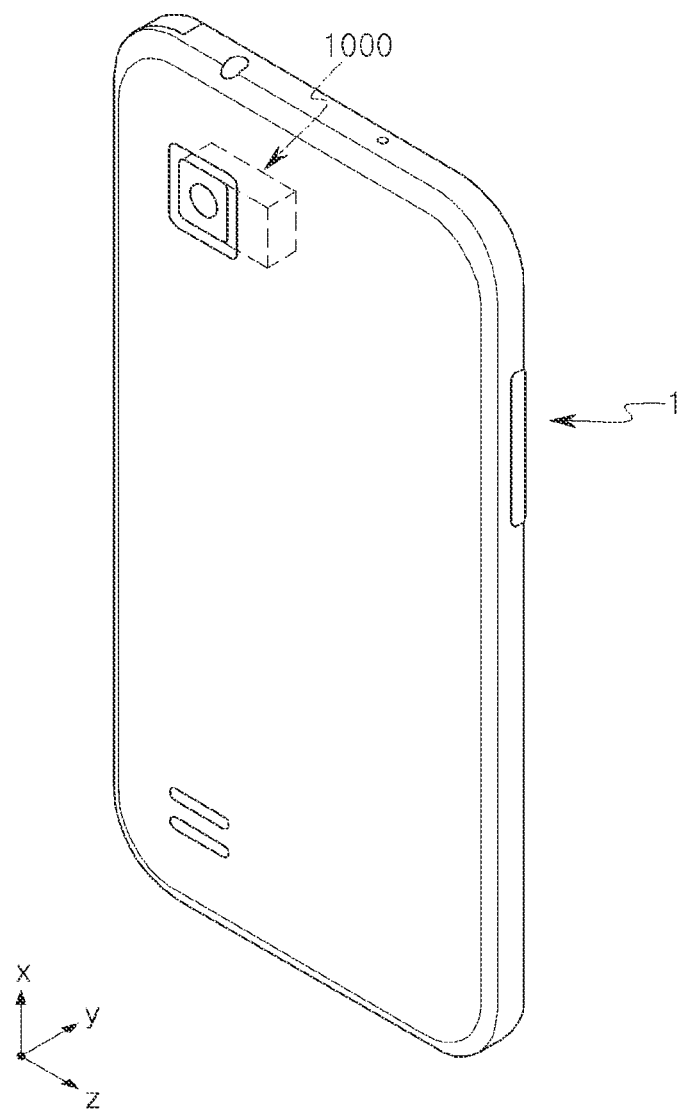
FIG. 1 is a perspective view of a portable electronic device according to a first example embodiment.

Hereinafter, while example embodiments of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of functions and constructions that would be well known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Herein, it is noted that use of the term "may" with respect to an example or embodiment, for example, as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein "portion" of an element may include the whole element or a part of the whole element less than the whole element.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," "lower," and the like may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of this disclosure. Further, although the examples described herein have a variety of configurations, other configurations are possible as will be apparent after an understanding of this disclosure.

An aspect of the present disclosure may provide a camera module having a reduced size. Specifically, an aspect of the present disclosure may provide a driving unit having a reduced thickness of a folded module provided in a camera module.

Further, an aspect of the present disclosure may provide an OIS driving unit capable of preventing or significantly reducing electromagnetic interference between a folded module and a magnetic member disposed around the folded module.

Figure 2:
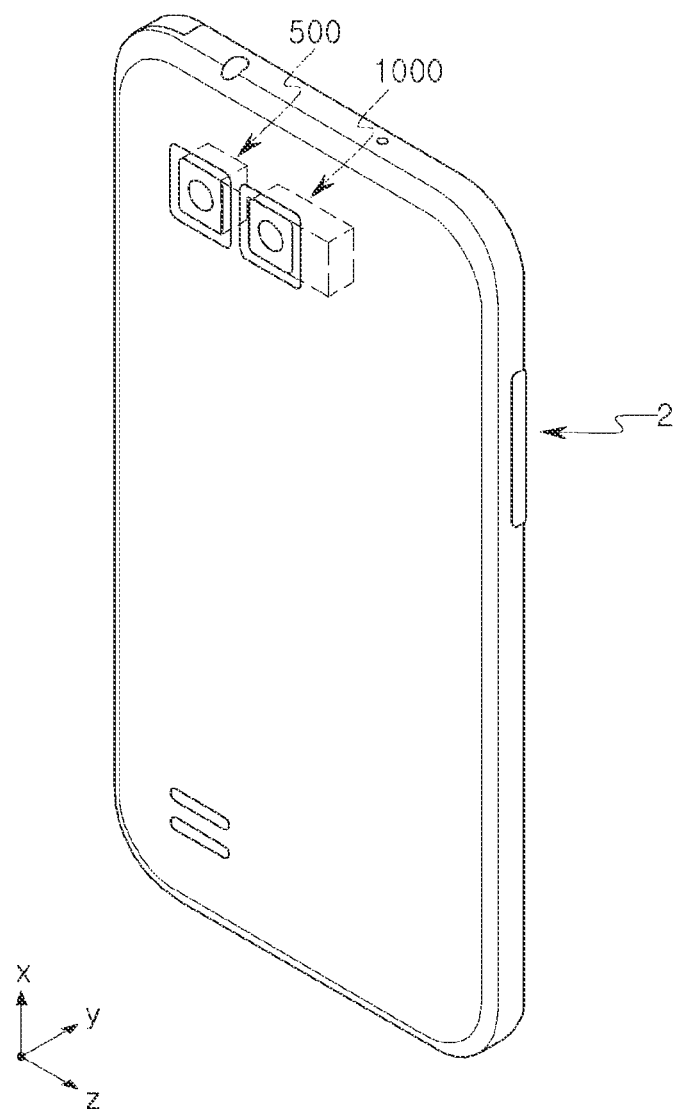
FIG. 2 is a perspective view of a portable electronic device according to a second example embodiment.
Figure 3:
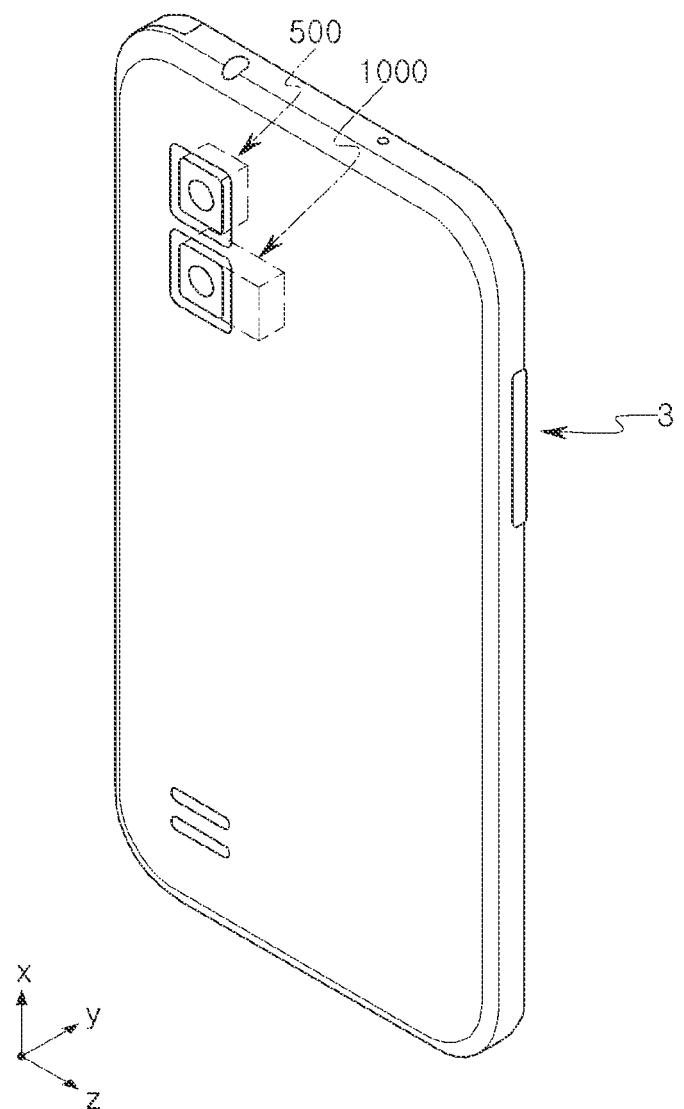
FIG. 3 is a perspective view of a portable electronic device according to a third example embodiment.

FIGS. 1 through 3 are perspective views of portable electronic devices according to example embodiments.

Referring to FIG. 1, a portable electronic device 1 according to an example embodiment of the present disclosure may be a portable electronic device such as a mobile communications terminal, a smartphone, a tablet personal computer (PC), or the like, in which a camera module 1000 is mounted.

As illustrated in FIG. 1, the portable electronic device 1 may be mounted with the camera module 1000 to capture an image of a subject.

The camera module 1000 may include a plurality of lenses, and an optical axis of each of the lenses may be directed toward a direction (a Z-axis) perpendicular to a thickness direction (a Y axis direction or a direction from a front surface of the portable electronic device to a rear surface thereof or an opposite direction to the direction from the front surface of the portable electronic device to the rear surface thereof) of the portable electronic device 1.

As an example, the optical axis of each of the plurality of lenses included in the camera module 1000 may be formed in a width direction or a length direction (an X-axis direction or a Z-axis direction) of the portable electronic device 1.

Therefore, even though the camera module 1000 has functions such as an autofocusing (hereinafter, referred to as AF) function, a zoom function, and an optical image stabilization (hereinafter, referred to as OIS) function, a thickness of the portable electronic device 1 may be prevented from increasing. Therefore, the portable electronic device 1 may be miniaturized.

The camera module 1000 may have at least one of the AF function, the zoom function, and the OIS function.

Since the camera module 1000 including the AF function, the zoom function, the OIS function, and the like, needs to include various components, a size of the camera module may be increased as compared to a general camera module.

When the size of the camera module 1000 is increased, a problem may occur in miniaturizing the portable electronic device 1 in which the camera module 1000 is mounted.

For example, when the number of stacked lenses in the camera module is increased for the purpose of the zoom function and a plurality of stacked lenses are formed in the camera module in the thickness direction of the portable electronic device, a thickness of the portable electronic device may also be increased depending on the number of stacked lenses. Therefore, when the thickness of the portable electronic device is not increased, the number of stacked lenses may not be sufficiently secured, such that zoom performance may be deteriorated.

In addition, an actuator moving a lens group in an optical axis direction or a direction perpendicular to the optical axis needs to be installed in order to implement the AF function and the OIS function, and when the optical axis of the lens group is formed in the thickness direction of the portable electronic device, the actuator for moving the lens group needs also to be installed in the thickness direction of the portable electronic device. Therefore, the thickness of the portable electronic device may be increased.

However, in the camera module 1000 where the optical axis of each of the plurality of lenses is disposed to be perpendicular to the thickness direction of the portable electronic device 1, even though the camera module 1000 having the AF function, the zoom function, and the OIS function is mounted in the portable electronic device 1, the portable electronic device 1 may be miniaturized.

As illustrated in FIGS. 2 and 3, portable electronic devices 2 and 3 may be mounted with two or more camera modules to capture an image of a subject. As an example, the portable electronic devices may further include a second camera module 500 together with the camera module (first camera module) 1000 described in FIG. 1.

Both the portable electronic devices 2 and 3 of FIGS. 2 and 3 may include two camera modules. FIG. 2 illustrates a case in which a first camera module 1000 and a second camera module 500 are sequentially arranged in a width direction (relatively short side direction) of the portable electronic device 2, and FIG. 3 illustrates a case in which the first camera module 1000 and the second camera module 500 are sequentially arranged along a length direction (relatively long side direction) of the portable electronic device 3. Three or more camera modules may also be mounted in the portable electronic device. The following description with regard to two camera modules extended to three or more camera modules will be apparent after an understanding of this disclosure.

In the case of using two camera modules, incident holes through which light is incident on the two camera modules may be arranged as close as possible.

The first camera module 1000 and the second camera module 500 may be configured to have angles of view different from each other. The first camera module 1000 may be configured to have a relatively narrow angle of view (e.g., a telephoto camera), and the second camera module 500 may be configured to have a relatively wide angle of view (e.g., a wide-angle camera). Here, the first camera module 1000 may correspond to a camera module described below with reference to FIGS. 4 through 18.

Figure 4:
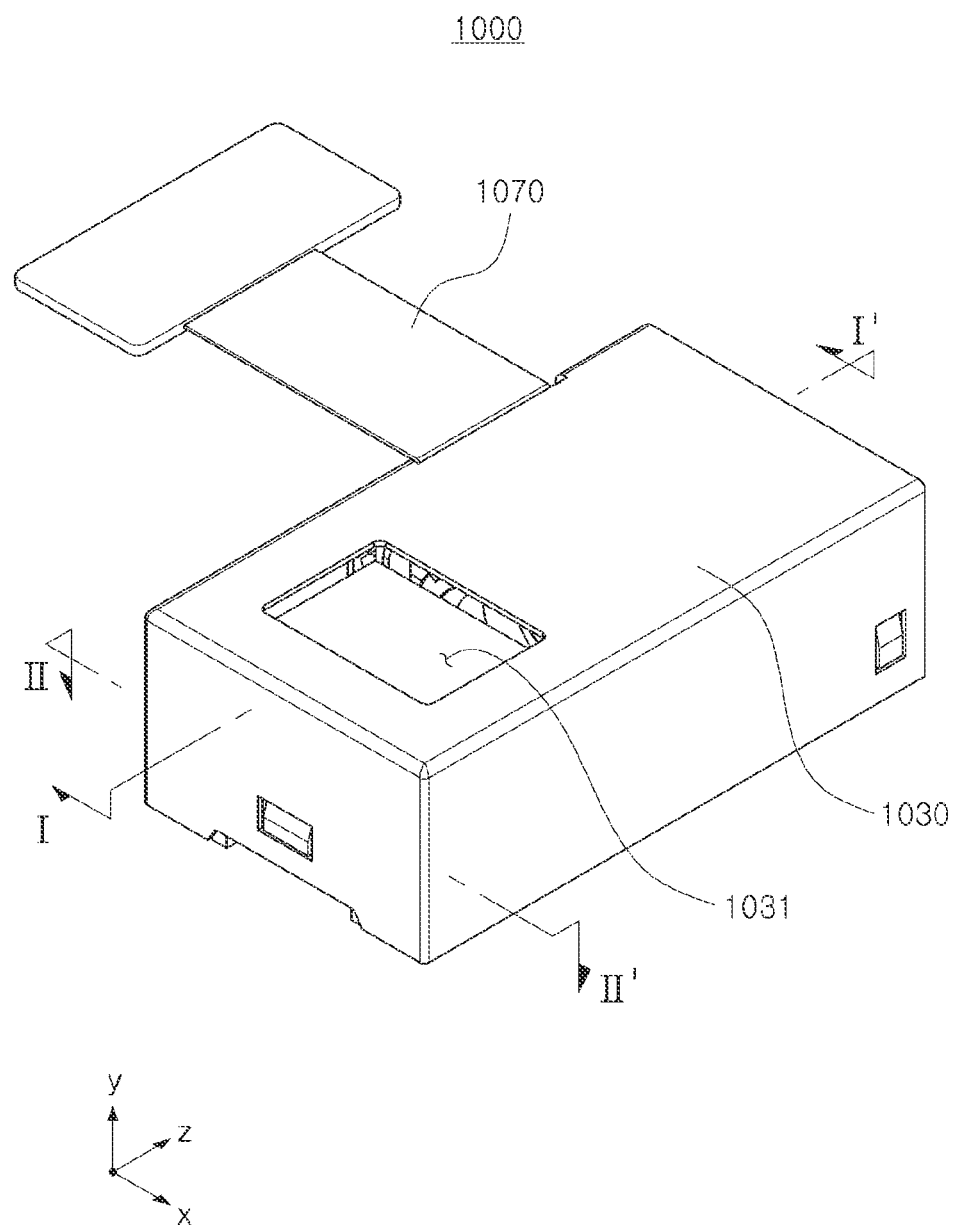
FIG. 4 is a perspective view of a camera module according to one or more example embodiments.
Figure 5:
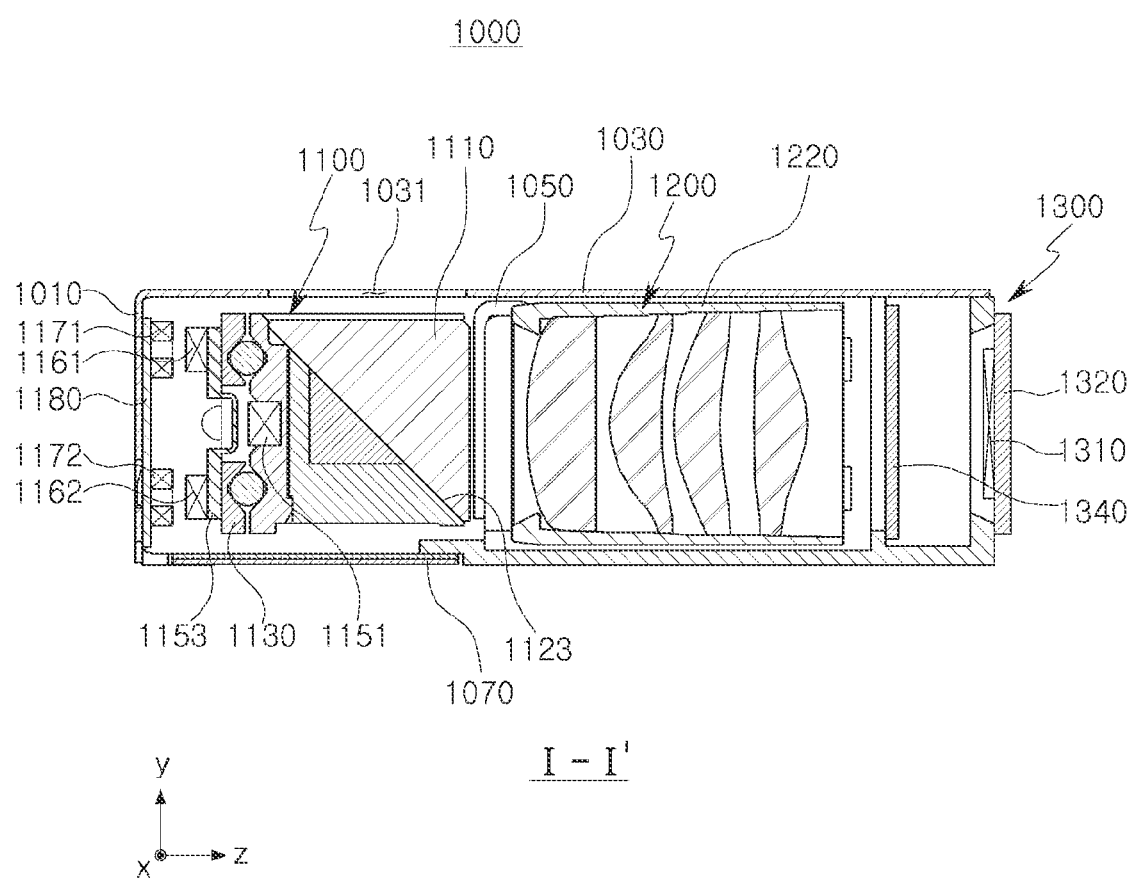
FIGS. 5 and 6 are cross-sectional views of the camera module according to one or more example embodiments.
Figure 6:
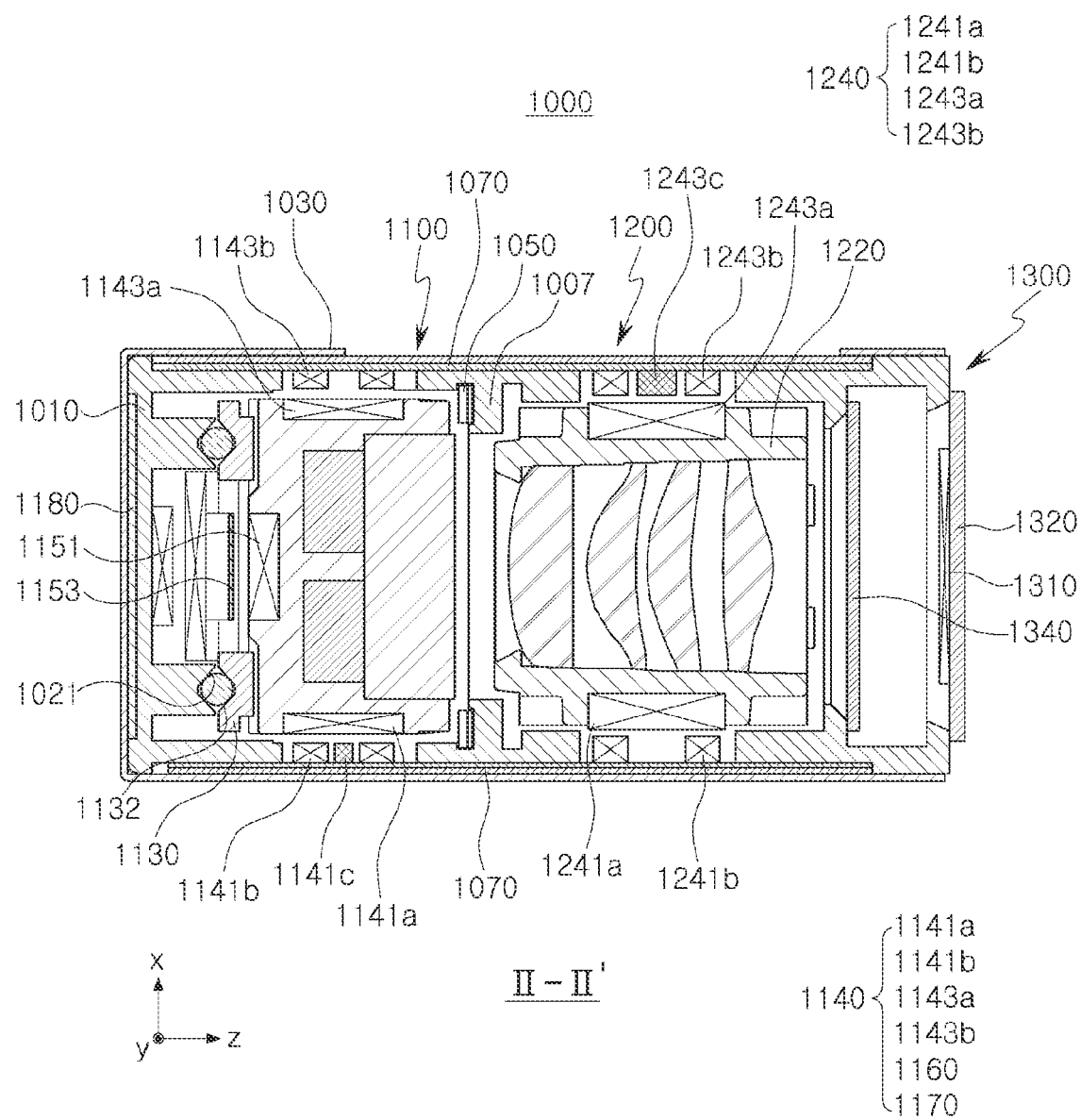
Figure 7:
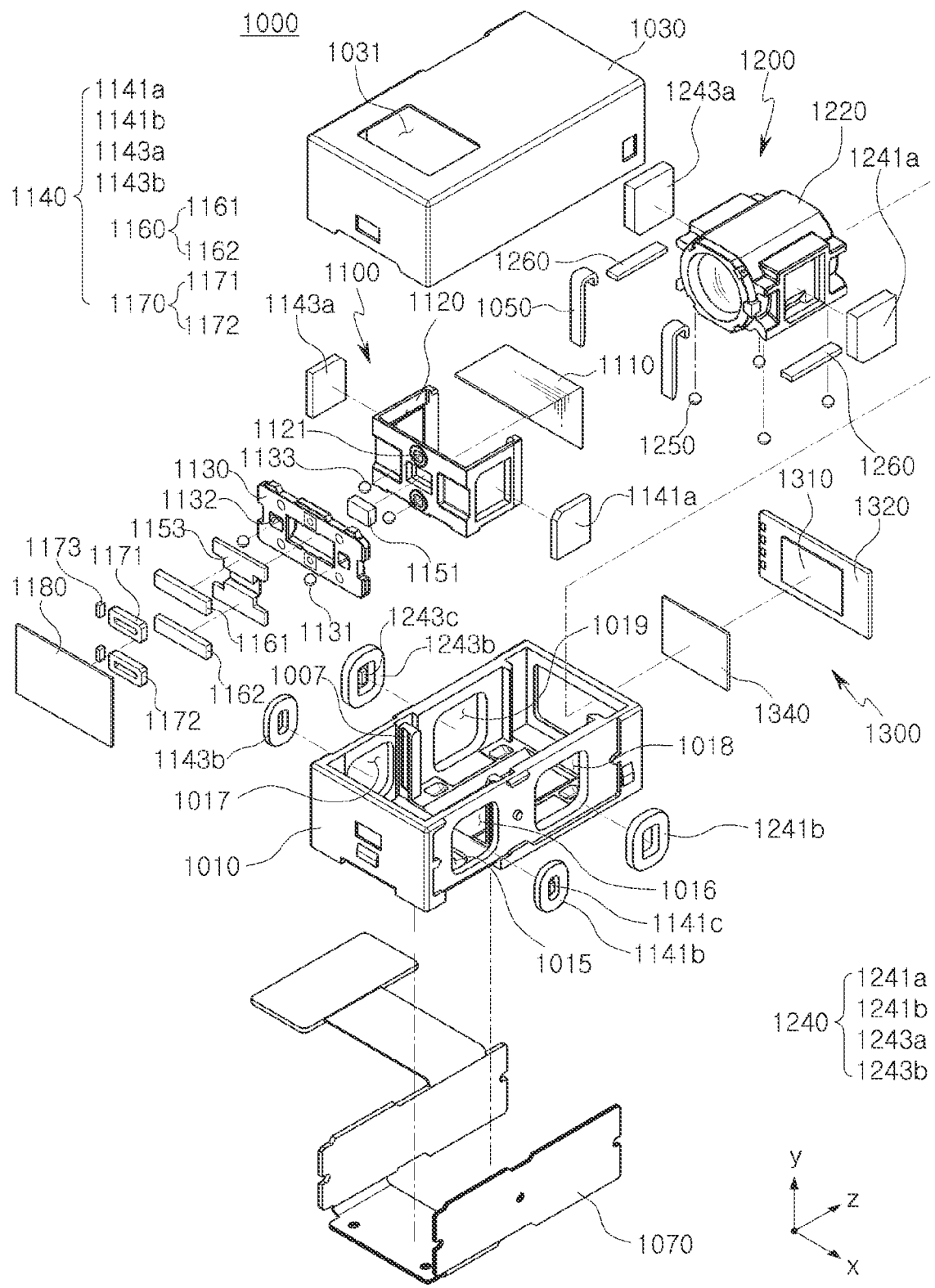
FIG. 7 is an exploded perspective view of the camera module according to one or more example embodiments.
Figure 8:
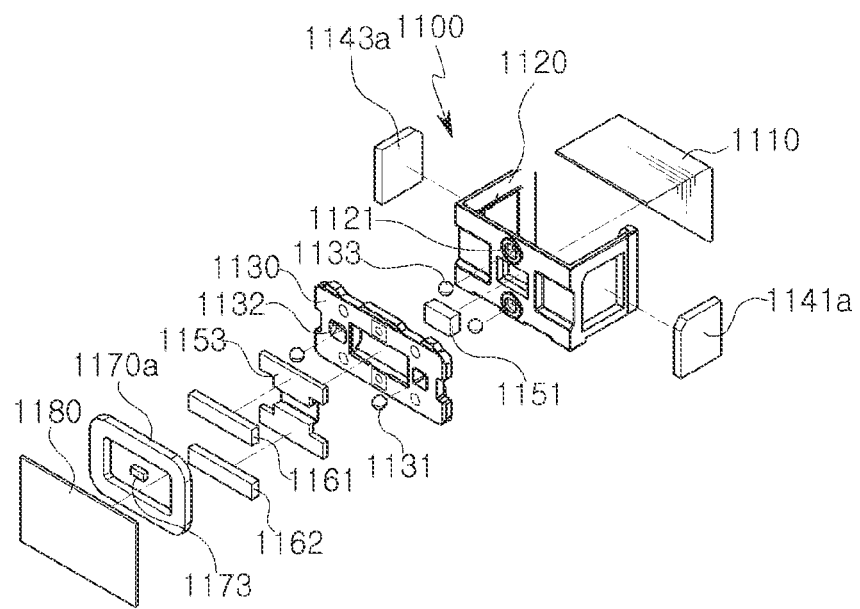
FIG. 8 is an exploded perspective view of a portion of a driving unit changed in a folded module according to one or more example embodiments.
Figure 9:
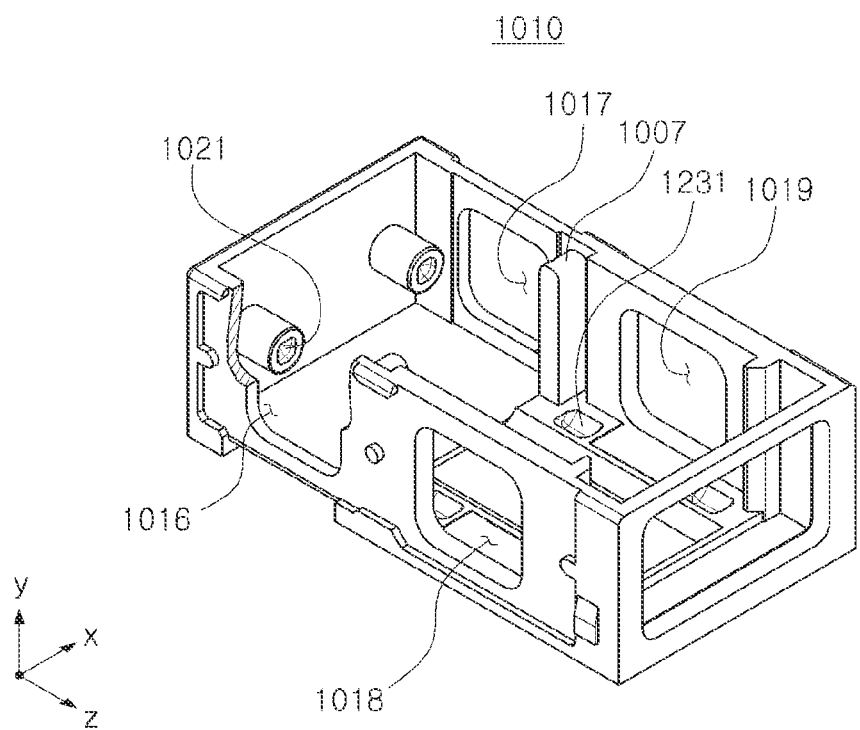
FIG. 9 is a perspective view of a housing of the camera module according to one or more example embodiments.
Figure 10:
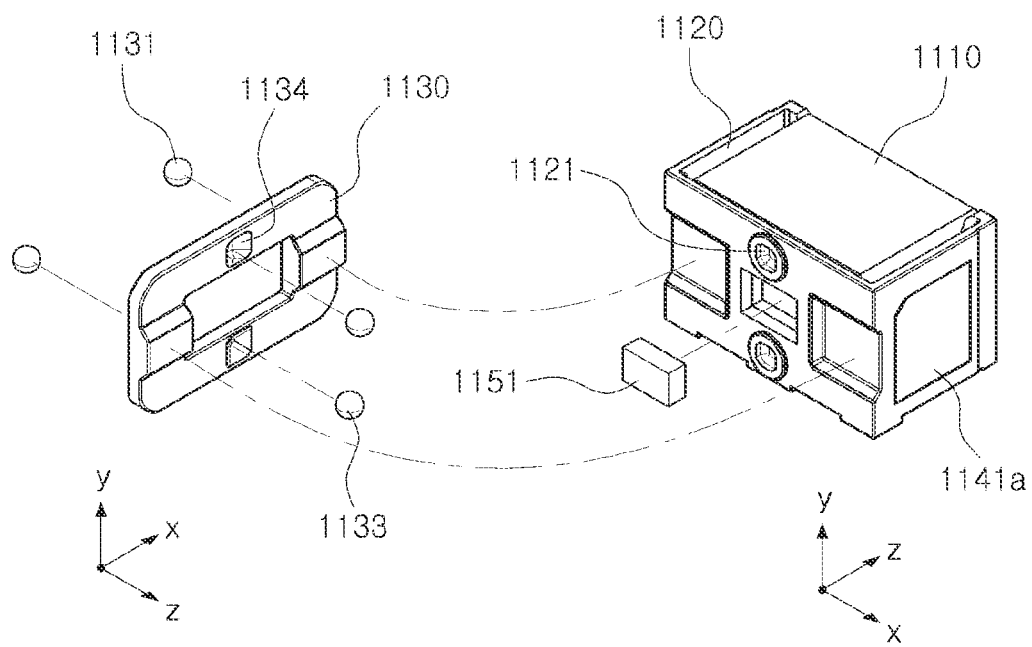
FIG. 10 is an exploded perspective view of a rotating plate and a rotating holder of the camera module according to one or more example embodiments.
Figure 11:
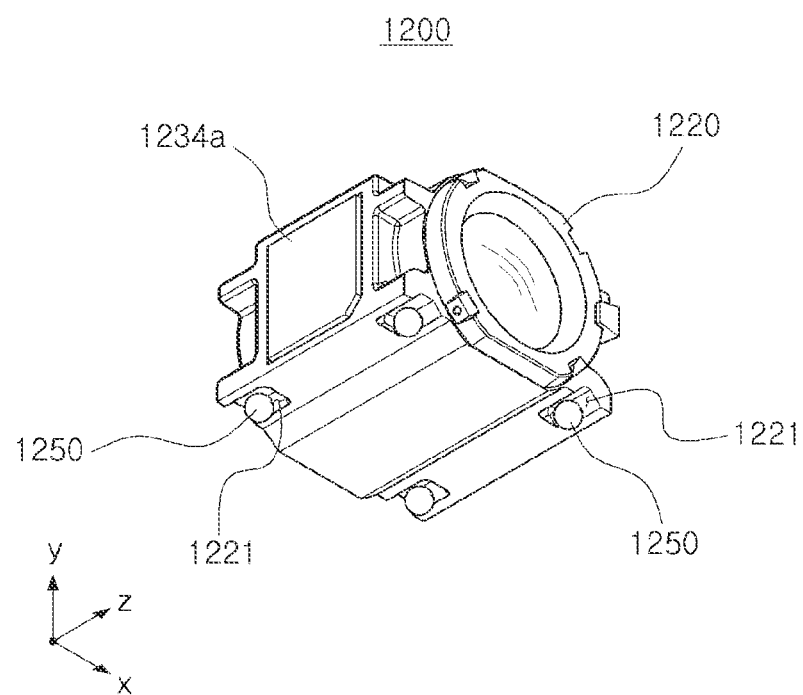
FIG. 11 is a perspective view of a lens holder of the camera module according to one or more example embodiments.
Figure 12:
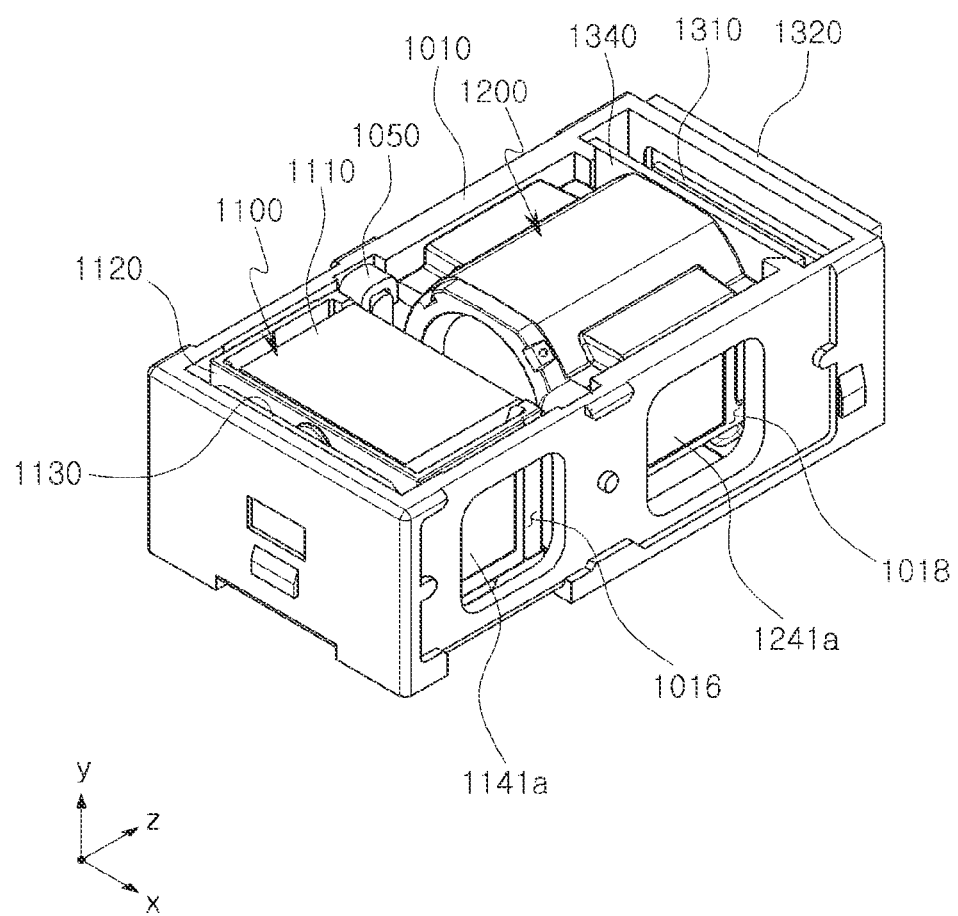
FIG. 12 is an assembled perspective view of the remaining portions excluding a cover in the camera module according to one or more example embodiments.
Figure 13:
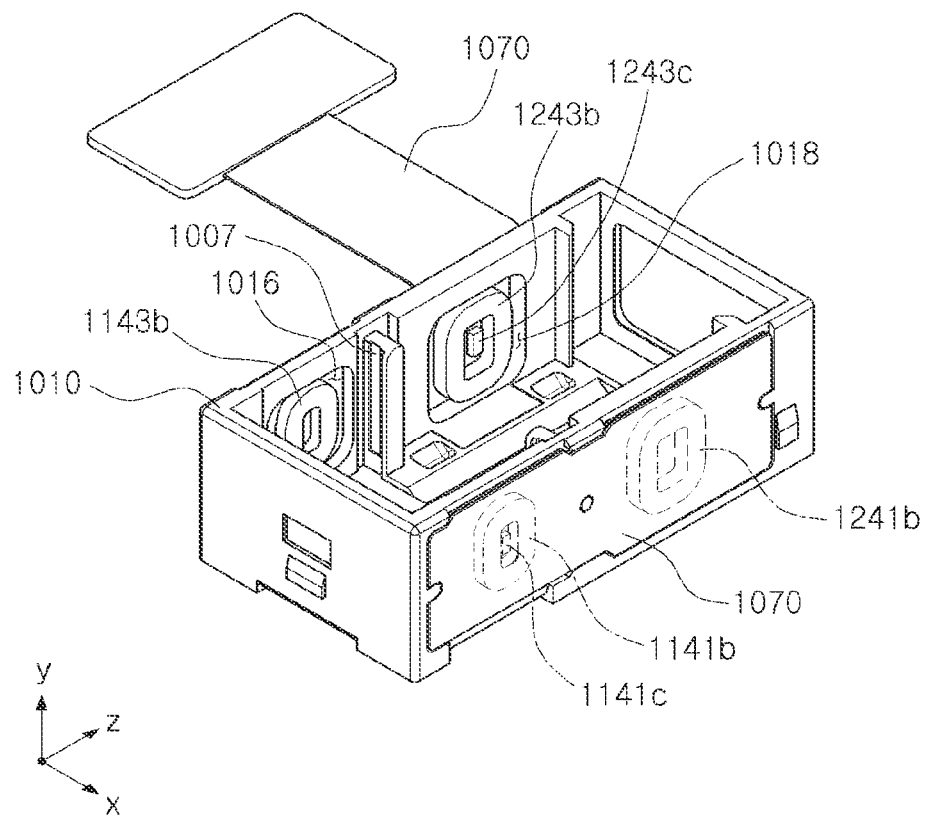
FIG. 13 is an assembled perspective view of a housing and a substrate in the camera module according to one or more example embodiments.

FIG. 4 is a perspective view of a camera module according to one or more example embodiments of the present disclosure and FIGS. 5 and 6 are cross-sectional views of the camera module according to one or more example embodiments of the present disclosure. FIG. 7 is an exploded perspective view of the camera module according to one or more example embodiments. FIG. 8 is an exploded perspective view of a portion of a driving unit changed in a folded module according to one or more example embodiments.

Referring to FIGS. 4 through 7, the camera module 1000 according to one or more example embodiments of the present disclosure may include a folded module 1100, a lens module 1200, and an image sensor module 1300 provided in a housing 1010.

The folded module 1100 may change a traveling direction of light. As an example, a traveling direction of light incident through an opening 1031 (see FIG. 4) of a cover 1030 covering an upper portion of the camera module 1000 may be changed so as to be directed to the lens module 1200 (or an image sensor 1310 provided in the image sensor module 1300) through the folded module 1100. To this end, the folded module 1100 may include a reflective member 1110 reflecting the light.

A path of light incident through the opening 1031 may be changed by the folded module 1100 so that the light is directed toward the lens module 1200. For example, the path of light incident in the thickness direction (Y axis direction) of the camera module 1000 may be changed by the folded module 1100 to substantially coincide with the optical axis (Z axis) direction.

The lens module 1200 may include a plurality of lenses through which the light of which the traveling direction is changed by the folded module 1100 passes. The plurality of lenses may be disposed in a lens barrel 1220, and the image sensor module 1300 may include the image sensor 1310 converting the light passing through the plurality of lenses into an electrical signal and a printed circuit board 1320 on which the image sensor 1310 is mounted. In addition, the image sensor module 1300 may include an optical filter 1340 filtering the light incident from the lens module 1200. The optical filter 1340 may be an infrared cut-off filter.

In an internal space of the housing 1010, the folded module 1100 may be provided in front of the lens module 1200 and the image sensor module 1300 may be provided behind the lens module 1200.

The folded module 1100, the lens module 1200, and the image sensor module 1300 may be sequentially provided from one side of the housing 1010 to the other side thereof in the housing 1010. The housing 1010 may have the internal space into which the folded module 1100, the lens module 1200, and the image sensor module 1300 are inserted (here, the printed circuit board 1320 included in the image sensor module 1300 may be inserted in the internal space of the housing 1010 or attached to an outer portion of the housing 1010). For example, as illustrated in the drawings, the housing 1010 may be integrally provided so that both of the folded module 1100 and the lens module 1200 are inserted into the internal space of the housing 1010. However, the housing 1010 is not limited thereto. For example, separate housings 1010 into which the folded module 1100 and the lens module 1200 are inserted, respectively, may also be connected to each other.

In addition, the housing 1010 may be covered by the cover 1030 so that the internal space of the housing 1010 is not visible.

The cover 1030 may have the opening 1031 through which light is incident, and the light incident through the opening 1031 may be incident on the lens module 1200 by changing the traveling direction by the folded module 1100. The cover 1030 may be integrally provided to cover the entire housing 1010, or may be provided by being divided into separate members covering the folded module 1100 and the lens module 1200, respectively.

To this end, the folded module 1100 may include the reflective member 1110 reflecting the light. In addition, the light incident on the lens module 1200 may be converted into an electrical signal by the image sensor 1310 after passing through a plurality of lenses and stored.

The housing 1010 may include the folded module 1100 and the lens module 1200 in the internal space thereof. In the internal space of the housing 1010, a space in which the folded module 1100 is disposed and a space in which the lens module 1200 is disposed may be distinguished from each other by protruding walls 1007. In addition, the folded module 1100 may be provided in front of the protruding walls 1007, and the lens module 1200 may be provided behind the protruding walls 1007. The protruding walls 1007 may be provided in a shape protruding from opposite sidewalls of the housing 1010 to the internal space.

The housing 1010 may include a stopper 1050 fitted onto the protruding walls 1007 while supporting a rotating holder 1120 and having a hook shape (even when the stoppers 1050 are not provided, the rotating holder 1120 may be fixed to the housing 1010 by an attractive force between a pulling magnet 1151 and a first pulling yoke 1153). The stoppers 1050 may have the hook shape, and may support the rotating holder 1120 in a state in which hook portions thereof are hooked onto the protruding walls 1007. The stoppers 1050 may serve as brackets supporting the rotating holder 1120 when the folded module 1100 is not driven, and additionally serve as the stoppers 1050 adjusting movement of the rotating holder 1120 when the folded module 1100 is driven. The stoppers 1050 may be provided, respectively, on the protruding walls 1007 protruding from the opposite sidewalls of the housing. A space may be provided between the stoppers 1050 and the rotating holder 1120 so that the rotating holder 1120 is smoothly rotated. Alternatively, the stoppers 1050 may be formed of an elastic material to allow the rotating holder 1120 to be smoothly moved in a state in which the rotating holder 1120 is supported by the stoppers 1050.

The folded module 1100 may be supported by the housing 1010. In the present disclosure, when a first component is supported by a second component, it means a state in which the first component is directly or indirectly attached to the second component by a force (e.g., magnetic attraction) acting on the second component. For example, when the folded module 1100 is supported on the inner surface of the housing 1010 by the magnetic attraction, it may mean that the folded module 1100 is directly or indirectly attached to the inner surface of the housing 1010 by the magnetic attraction by acting on the magnetic attraction toward the inner wall of the housing 1010 on the folded module 1100.

The folded module 1100 may include magnetic members configured to support a rotating plate 1130 and/or the rotating holder 1120 on the housing 1010. In the present disclosure, a magnetic member refers to a component formed of a magnetic substance (magnetic material). In an example embodiment, the folded module 1100 may be supported on one surface of the housing 1010 by magnetic attraction between the magnetic members.

The folded module 1100 may include magnetic members provided in the housing 1010 and the rotating holder 1120, respectively. In an example embodiment, the folded module 1100 may include a first magnetic member provided in the housing 1010 and a second magnetic member provided in the rotating holder 1120. The first magnetic member and the second magnetic member may be configured to generate magnetic attraction therebetween. For example, the first magnetic member may be a magnet, and the second magnetic member may be a yoke. As another example, the first magnetic member may be a yoke, and the second magnetic member may be a magnet. In an example embodiment, the first magnetic member and the second magnetic member may be disposed to face each other.

The folded module 1100 may include magnetic members provided in the housing 1010 and the rotating plate holder 1130, respectively. In an example embodiment, the folded module 1100 may include a first magnetic member (for example, a second pulling yoke 1180 in FIG. 7) and a second magnetic member provided in the rotating plate 1130 (for example, a first magnet 1161 and a second magnet 1162 in FIG. 7). For example, the first magnetic member may be a magnet, and the second magnetic member may be a yoke. As another example, the first magnetic member may be a yoke, and the second magnetic member may be a magnet. In an example embodiment, the first magnetic member and the second magnetic member may be disposed to face each other.

The folded module 1100 may include magnetic members provided in the rotating plate 1130 and the rotating holder 1120, respectively. In an example embodiment, the folded module 1100 may include a first magnetic member provided in the rotating plate 1130 (for example, a first pulling yoke 1153 in FIG. 7) and a second magnetic member provided in the rotating holder 1120 (for example, a pulling magnet 1151 in FIG. 7). For example, the first magnetic member may be a magnet, and the second magnetic member may be a yoke. As another example, the first magnetic member may be a yoke, and the second magnetic member may be a magnet.

Meanwhile, in the present disclosure, support force for the housing 1010 of the rotating holder 1120 is generated by magnetic attraction between the magnetic members, but the example embodiments of the present disclosure are not limited thereto, and the rotating holder 1120 may be supported by the housing 1010 in a different manner. For example, a wire may be connected between the rotating holder 1120 (or the rotating plate 1130) and the housing 1010, so that the rotating holder 1120 (or the rotating plate 1130) may be supported by the housing 1010.

The folded module 1100 may change the path of the light incident through the opening 1031. When an image or a moving picture is captured, the image may be blurred or the moving picture may be shaken due to a hand-shake, or the like, of a user. In this case, the folded module 1100 may correct the hand-shake, or the like, of the user by moving the rotating holder 1120 on which the reflective member 1110 is mounted. For example, when a shake is generated at the time of capturing the image or the moving picture due to the hand-shake, or the like, of the user, a relative displacement corresponding to the shake may be provided to the rotating holder 1120 to compensate for the shake.

In addition, in the present example embodiment, the OIS function may be implemented by the movement of the rotating holder 1120 having a relatively low weight since it does not include lenses, and the like, and power consumption may thus be significantly reduced.

That is, in the present example embodiment, the light on which the OIS is performed may be incident to the lens module 1200 by changing the traveling direction of the light by the movement of the rotating holder 1120 on which the reflective member 1110 is provided without moving the lens barrel including the plurality of lenses or the image sensor in order to implement the OIS function.

The folded module 1100 may include the rotating holder 1120 provided in the housing 1010 to be supported by the housing 1010, the reflective member 1110 mounted on the rotating holder 1120, and an OIS driving unit 1140 moving the rotating holder 1120. In the present disclosure, the OIS driving unit 1140 is described as one component of the folded module 1100, but in another example embodiment, the OIS driving unit 1140 may be included in the camera module 1000 as a separate component from the folded module 1100.

The reflective member 1110 may change the traveling direction of the light. For example, the reflective member 1110 may be a mirror or a prism reflecting the light (a case in which the reflective member 1110 is the prism is illustrated in the drawings associated with the example embodiments for convenience of explanation).

The reflective member 1110 may be fixed to the rotating holder 1120. The rotating holder 1120 may have a mounted surface 1123 on which the reflective member 1110 is mounted.

The mounted surface 1123 of the rotating holder 1120 may be an inclined surface so that the path of the light is changed. For example, the mounted surface 1123 may be an inclined surface inclined with respect to the optical axis (the Z axis) of each of the plurality of lenses by 30 to 60°. In addition, the inclined surface of the rotating holder 1120 may be directed toward the opening 1031 of the cover 1030 through which the light is incident.

The rotating holder 1120 on which the reflective member 1110 is mounted may be movably accommodated in the internal space of the housing 1010. For example, the rotating holder 1120 may be accommodated in the housing 1010 to be rotatable around a first axis (an X axis) and a second axis (a Y axis). Here, the first axis (the X axis) and the second axis (the Y axis) refer to axes perpendicular to the optical axis (the Z axis), and may be perpendicular to each other.

A rotation axis of the rotating holder 1120 may be parallel to or substantially parallel to the surface in the housing 1010 supporting the rotating holder 1120. In an example embodiment, the first axis (X axis) and the second axis (Y axis) of the rotating holder 1120 may be perpendicular or substantially perpendicular to the direction in which the rotating holder 1120 is supported by the housing 1010 (a direction parallel to the Z axis).

The rotating holder 1120 may be supported on the housing 1010 by first ball members 1131 aligned along the first axis (the X axis) and second ball members 1133 aligned along the second axis (the Y axis) so that it smoothly rotates around the first axis (the X axis) and the second axis (the Y axis). In the drawings, two first ball members 1131 aligned along the first axis (the X axis) and two second ball members 1133 aligned along the second axis (the Y axis) are illustrated by way of example. The rotating holder 1120 may rotate around the first axis (the X axis) and the second axis (the Y axis) by the OIS driving unit 1140.

The folded module 1100 may further include the rotating plate 1130 provided between the rotating holder 1120 and the inner surface of the housing 1010. The rotating holder 1120 may be attached to the rotating plate 1130 (or the rotating plate 1130 may be attached to the rotating holder 1120) by the attractive force between the pulling magnet 1151 (or the pulling yoke) provided in the rotating holder 1120 and the first pulling yoke 1153 (or the pulling magnet) provided in the rotating plate 1130. Since the second ball member 1133 is provided between the rotating holder 1120 and the rotating plate 1130, the rotating plate 1130 may not directly contact the rotating holder 1120. In another example embodiment, the first pulling yoke 1153 provided in the rotating plate 1130 may be omitted.

In addition, the first ball members 1131 and the second ball members 1133 may be provided on a front surface (a surface facing a −Z direction in the drawing) and a rear surface (a surface facing a +Z direction in the drawing) of the rotating plate 1130, respectively. In another example embodiment, the first ball members 1131 and the second ball members 1133 may be provided at opposite positions, on the rear and front surfaces of the rotating plate 1130, respectively. For example, the first ball members 1131 may be aligned along the second axis (Y axis) and the second ball members 1133 may be aligned along the first axis (X axis). Hereinafter, the structure illustrated in the drawings will be described for convenience of explanation.

Magnetic attraction may arise between the magnet (for example, the magnet 1160) of the OIS driving unit 1140 provided in the rotating plate 1130 and the second pulling yoke 1180 provided in the housing 1010. Accordingly, the rotating plate 1130 may be supported by the housing 1010, and thus the rotating holder 1120 attached to the rotating plate 1130 by magnetic force may be supported by the housing 1010.

In the illustrated example embodiments, the second pulling yoke 1180 has a shape of a flat plate, but this is only an example, and in another example embodiment, the second pulling yoke 1180 may be configured with two or more yokes or may have various shapes. For example, the second pulling yoke 1180 may be configured with two yokes facing the first magnet 1161 and the second magnet 1162, respectively.

In another example embodiment, magnetic attraction may be generated directly between the pulling magnet 1151 provided in the rotating holder 1120 and the second pulling yoke 1180 provided in the housing 1010. The second pulling yoke 1180 provided in the housing 1010 directly pulls the rotating holder 1120, and thus, the rotating holder 1120 may be supported by the housing 1010 via the rotating plate 1130. For example, a portion of the second pulling yoke 1180 may extend toward the pulling magnet 1151 provided in the rotating holder 1120. When a portion of the second pulling yoke 1180 is disposed at a position close to the pulling magnet 1151, magnetic attraction may arise between the second pulling yoke 1180 and the pulling magnet 1151, and this may make the rotating holder 1120 supported by the housing 1010. In this case, the first pulling yoke 1153 provided in the rotating plate 1130 may be omitted.

Seating grooves 1132 and 1134 into which the first ball members 1131 and the second ball members 1133 are inserted, respectively, may be provided in the front surface and the rear surface of the rotating plate 1130, respectively, and may include first seating grooves 1132 into which the first ball members 1131 are partially inserted and second seating grooves 1134 into which the second ball members 1133 are partially inserted.

In addition, the housing 1010 may be provided with third seating grooves 1021 into which the first ball members 1131 are partially inserted, and the rotating holder 1120 may be provided with fourth seating grooves 1121 into which the second ball members 1133 are partially inserted.

The first seating grooves 1132, the second seating grooves 1134, the third seating grooves 1021, and the fourth seating grooves 1121 described above may be provided in a hemispherical or polygonal (poly-prismatic or poly-pyramidal) groove shape so that the first ball members 1131 and the second ball members 1133 are easily rotated (depths of the seating grooves 1132, 1134, 1021, and 1121 may be smaller than radii thereof in order for the first ball members 1131 and the second ball members 1133 to be easily rotated. The first ball members 1131 and the second ball members 1133 do not entirely enter the seating grooves, but may be partially exposed, such that the rotating plate 1130 and the rotating holder 1120 may be easily rotated. In addition, positions and the numbers of first seating grooves 1132, second seating grooves 1134, third seating grooves 1021, and fourth seating grooves 1121 may correspond to those of first ball members 1131 aligned along the first axis (the X axis) and second ball members 1133 aligned along the second axis (the Y axis).

Here, the first ball members 1131 and the second ball members 1133 may serve as bearings while being rolled or slid in the first seating grooves 1132, the second seating grooves 1134, the third seating grooves 1021, and the fourth seating grooves 1121.

Meanwhile, the first ball members 1131 and the second ball members 1133 may have a structure in which they are fixedly provided in at least one of the housing 1010, the rotating plate 1130, and the rotating holder 1120. For example, the first ball members 1131 may be fixedly provided in the housing 1010 or the rotating plate 1130, and the second ball members 1133 may be fixedly provided in the rotating plate 1130 or the rotating holder 1120. In this case, only a member facing a member in which the first ball members 1131 or the second ball members 1133 are fixedly provided may be provided with the seating grooves. In this case, the ball members may serve as friction bearings by sliding thereof rather than rotation thereof.

Here, when the first ball members 1131 and the second ball members 1133 are fixedly provided in any one of the housing 1010, the rotating plate 1130, and the rotating holder 1120, the first ball members 1131 and the second ball members 1133 may be provided in a spherical shape or a hemispherical shape (a case in which the first ball members 1131 and the second ball members 1133 are provided in the hemispherical shape is only an example, and the first ball members 1131 and the second ball members 1133 may also be provided to have a protruding length greater or smaller than that of a hemisphere). A case in which the ball members 1131 and 1133 are provided in the cylindrical shapes extended along the first axis (the X axis) and the second axis (the Y axis), respectively, may also be similarly applied.

In addition, the first ball members 1131 and the second ball members 1133 may be separately manufactured and be then attached to any one of the housing 1010, the rotating plate 1130, and the rotating holder 1120. Alternatively, the first ball members 1131 and the second ball members 1133 may be provided integrally with the housing 1010, the rotating plate 1130, or the rotating holder 1120 at the time of manufacturing the housing 1010, the rotating plate 1130, or the rotating holder 1120.

The OIS driving unit 1140 may generate driving force so that the rotating holder 1120 is rotatable around the two axes. As an example, the OIS driving unit 1140 may include magnets 1141a, 1143a, and 1160 and coils 1141b, 1143b, and 1170 disposed to face the magnets 1141a, 1143a, and 1160.

When power is applied to the coils 1141b, 1143b, and 1170, the rotating holder 1120 on which the magnets 1141a, 1143a, and 1160 are mounted may rotate around the first axis (the X axis) and the second axis (the Y axis) by electromagnetic interaction between the magnets 1141a, 1143a, and 1160 and the coils 1141b, 1143b, and 1170.

The magnets 1141a, 1143a, 1160 may be provided on the rotating holder 1120 or the rotating plate 1130. For example, some magnets 1160 of the magnets 1141a, 1143a, 1160 may be provided on the front surface of the rotating plate 1130 (a surface facing the −Z direction in FIG. 7), and the remaining magnets 1141a and 1143a may be mounted on the side surface of the rotating holder 1120 (e.g., a surface facing the +X/−X direction in FIG. 7).

The coils 1141b, 1143b, and 1170 may be mounted on the housing 1010. As an example, the coils 1141b, 1143b, and 1170 may be mounted on the housing 1010 through a main board 1070. That is, the coils 1141b, 1143b, and 1170 may be provided on the main board 1070, and the main board 1070 may be mounted on the housing 1010. Here, an example in which the main board 1070 is entirely integrally provided so that both of the coils for the folded module 1100 and the coils for the lens module 1200 are mounted thereon is illustrated in the drawings, but the main board 1070 may be provided as two or more separate boards on which the coils for the folded module 1100 and the coils for the lens module 1200 are mounted, respectively.

Some of the coils 1141b, 1143b, and 1170 or the magnets 1141a, 1143a, and 1160 may be used to rotate the rotating holder 1120 and the rotating plate 1130 about the first axis (e.g., X axis) with respect to the housing 1010, and some may be used to rotate the rotating holder 1120 with respect to the rotating plate 1130 in the second axis (e.g., Y axis). In the present disclosure, for convenience of explanation, the reflective member 1110, the rotating holder 1120, and the rotating plate 1130 rotating about the first axis with respect to the housing 1010 may be referred to as a reflecting unit. However, the components constituting the reflecting unit are not limited to the reflective member 1110, the rotating holder 1120, and the rotating plate 1130. The reflecting unit may be understood as a concept including components that rotate about the first axis with respect to the housing 1010 together with the rotating plate 1130.

The magnet 1160 and the coil 1170 may be used to rotate the reflecting unit in the first direction (X axis direction). The electromagnetic force arising between the first magnet 1161 and a first coil 1171 and/or the electromagnetic force arising between the second magnet 1162 and a second coil 1172 may rotate the reflecting unit about the X axis.

The magnet 1160 and the coil 1170 may be provided to face substantially in a direction in which light is reflected by the reflective member 1110 and emitted. The reflective member 1110 may reflect light incident in the Y axis direction in the Z axis direction, and the magnet 1160 and the coil 1170 may be parallel to or substantially aligned with the Z axis direction. The magnet 1160 and the coil 1170 may face each other in the Z axis direction.

Some of the OIS driving unit may be disposed in a direction in which the reflecting unit is supported. The reflecting unit may be supported by the housing 1010 by magnetic attraction between the magnetic members, and the coil 1160 and the magnet 1170 may be aligned to face each other in a direction in which the magnetic attraction acts.

The magnet 1160 may be disposed to face a surface of the housing 1010 on which the reflecting unit is supported. In an example embodiment, the magnet 1160 may be disposed to face the same surface as a surface of the housing 1010 supporting a rotation axis of the reflecting unit (a rotation axis parallel to the X axis and passing through the first ball members 1131). In an example embodiment, the coil 1170 may be disposed to face the magnet 1160. In an example embodiment, the first magnet 1161 and the second magnet 1162 may be disposed to face the first coil 1171 and the second coil 1172, respectively. For example, when the first coil 1171 is provided on the inner surface of the housing 1010 and the first magnet 1161 is provided on the front of the rotating plate 1130, the first coil 1171 and the first magnet 1161 may face each other.

The first magnet 1161 and the second magnet 1162 may be disposed opposite to each other with respect to the rotation axis of the housing 1010 of the rotating plate 1130. The rotating plate 1130 may rotate with respect to the housing 1010 about the rotation axis parallel to the X axis and passing through the first ball members 1131. Therefore, in an example embodiment, the first magnet 1161 and the second magnet 1162 may be provided on the rotating plate 1130 so as to be aligned in the Y axis direction. For example, the first magnet 1161 may be positioned in the +Y direction of the rotation axis passing through the two first ball members 1131, and the second magnet 1162 may be positioned in the −Y direction of the rotation axis. In an example embodiment, since the first coil 1171 and the second coil 1172 are provided in the housing 1010 to face the first magnet 1161 and the second magnet 1162, respectively, the coils 1170 may also be aligned in the Y axis direction. In an example embodiment in which one coil 1170a is provided in the housing 1010 instead of the first coil 1171 and the second coil 1172 as in the example embodiment of FIG. 8, one side and the other side of the coil 1170a may be disposed to face the first magnet 1161 and the second magnet 1162, respectively.

For example, when a surface of the first magnet 1161 facing the first coil 1171 is magnetized with an N-pole, the rotation of the rotating holder 1120 in the X axis direction may be implemented by the following principle. When a magnetic line of force is directed toward the first magnet 1161 in a magnetic field generated by the first coil 1171, a repulsive force may arise between the first coil 1171 and the first magnet 1161. Such a repulsive force may rotate the reflecting unit in a clockwise direction about the rotation axis passing through the first ball members 1131 and parallel to the X axis. When the magnetic line of force is directed in the −Z direction in the magnetic field generated by the first coil 1171, an attractive force arises between the first coil 1171 and the first magnet 1161. Such attractive force may rotate the reflecting unit in a counterclockwise direction around the rotation axis.

The first magnet 1161 and the second magnet 1162 may have the same or different polarities. For example, the first magnet 1161 may have an N pole and the second magnet 1162 may have an S pole. As another example, both the first magnet 1161 and the second magnet 1162 may have the N pole or the S pole. In the present disclosure, the magnet having the N pole or the S pole may mean that a surface (or portion) facing the corresponding coil (e.g., the first coil 1171) in the magnet (e.g., the first magnet 1161) has the N pole or the S pole.

When the OIS is driven, currents moving through the first coil 1171 and the second coil 1172, respectively, may be controlled so that the electromagnetic force between the first magnet 1161 and the first coil 1171 and the electromagnetic force between the second magnet 1162 and the second coil 1172 face in opposite directions to each other. For example, if a repulsive force arises between the first coil 1171 and the first magnet 1161 by the current moving through the first coil 1171, the current moving through the second coil 1172 may be controlled to generate an attractive force between the second coil 1172 and the second magnet 1162. Conversely, if an attractive force arises between the first coil 1171 and the first magnet 1161 by the current moving through the first coil 1171, the current moving through the second coil 1172 may be controlled to generate a repulsive force between the second coil 1172 and the second magnet 1162. As a result, the reflecting unit may be rotated by a relatively small electromagnetic force. When the strength of the electromagnetic force required to drive the OIS decreases, a size of a driving coil (for example, the first coil 1171, the second coil 1172) or a driving magnet (for example, the first magnet 1161, the second magnet 1162) may be reduced, which may contribute to miniaturization of the camera module.

In the illustrated example embodiments, the first magnet 1161 and the second magnet 1162 are illustrated as separate components, but the example embodiments of the present disclosure are not limited thereto, and in another example embodiment, the first magnet 1161 and the second magnet 1162 may be integrally formed. Instead of the first magnet 1161 and the second magnet 1162, a single magnet may be provided on the front surface of the rotating plate 1130 so as to face the first coil 1171 and the second coil 1172. The single magnet may be magnetized so that a surface facing the first coil 1171 is polarized. A direction in which the magnet is polarized may coincide with a direction in which the first magnet 1161 and the second magnet 1162 are aligned. For example, the magnet may be magnetized so that a portion facing the first coil 1171 has an N pole (or S pole), and a portion facing the second coil 1172 has an S pole (or N pole). The single magnet may have a single polarity.

In the illustrated example embodiments, the first coil 1171 and the second coil 1172 are illustrated as separate components, but the example embodiments of the present disclosure are not limited thereto, and in another example embodiment, one coil may replace the first coil 1171 and the second coil 1172. A related example embodiment is illustrated in FIG. 8. Referring to FIG. 8, in an example embodiment, a single coil 1170a may be used for driving in the X axis direction (driving rotation about the X axis direction). The first magnet 1161 and the second magnet 1162 may be disposed to face an upper portion of the single coil 1170a and to face a lower portion of the single coil 1170a, respectively.

In FIG. 8, the reflecting unit may rotate about the X axis by electromagnetic interaction between the coil 1170a and the magnets 1161 and 1162. For example, when a current moves through the coil 1170a, a Lorentz force may be generated between the coil 1170a and the magnets 1161 and 1162. The electromagnetic force between the coil 1170a and the magnets 1161 and 1162 generates a moment in the X axis direction on the reflecting unit, which may rotate the reflecting unit about the X axis.

A reinforcing plate (not illustrated) may be mounted beneath the main board 1070 in order to reinforce strength of the main board 1070.

In the present example embodiment, when the rotating holder 1120 rotates, a closed loop control manner of sensing and feeding back a position of the rotating holder 1120 may be used. Therefore, position sensors 1141c and 1173 may be required in order to perform closed loop control. The position sensors 1141c and 1173 may be hall sensors.

The position sensors 1141c and 1173 may be disposed inside or outside the coils 1141b, 1170, and 1170a, respectively, and may be mounted on the main board 1070 on which the coils 1141b, 1170, and 1170a are mounted.

The main board 1070 may be provided with a gyro sensor (not illustrated) sensing a shake factor such as the handshake, or the like, of the user, and may be provided with a driver integrated circuit (IC) providing driving signals to the coils 1141b, 1143b, 1170, and 1170a.

In addition, the housing 1010 may include an AF driving unit 1240 to drive the lens module 1200. The AF driving unit 1240 may include coils 1241b and 1243b for driving the lens module 1200. The AF driving unit 1240 may include magnets 1241a and 1243a disposed on the lens barrel 1220 facing the coils 1241b and 1243b, respectively, to drive the lens barrel 1220 by magnetic interaction between the coils 1241b and 1243b and the magnets 1241a and 1243a. In an example, the lens module 1200 may include ball members 1250 disposed between the lens barrel 1220 and a surface of the housing 1010 to allow smooth AF movement in the optical axis direction of the plurality of lenses. Magnetic members 1260, for example, magnets opposing yokes disposed in the housing 1010, may provide an attractive force to maintain the ball members 1250 in contact with the surface of the housing 1010 and the lens barrel 1220. The ball members 1250 may be disposed in opposing groves 1221 and 1231 in the lens barrel 1220 and the surface of the housing 1010, respectively. When the lens barrel 1220 moves in the optical axis direction of the plurality of lenses to implement the AF function, a closed loop control manner of sensing and feeding back a position of the lens barrel 1220 may be used. Therefore, position sensor 1243c may be required in order to perform closed loop control. The position sensor 1243c may be a hall sensor.

Referring to FIG. 7, since the coils 1141b, 1143b, 1241b, and 1243b are provided on the housing 1010 in a state in which they are mounted on the main board 1070, the housing 1010 may be provided with through-holes 1016, 1017, 1018, and 1019 so that the coils 1141b, 1143b, 1241b, and 1243b are exposed to the internal space of the housing 1010.

The main board 1070 on which the coils 1141b, 1143b, 1170, 1241b, and 1243b are mounted may be entirely connected and integrally provided as illustrated in the drawings. In this case, a terminal may be provided as a single terminal, and connection of an external power supply and signals may thus be easy. However, the main board 1070 is not limited thereto, but may also be provided as a plurality of boards by separating a board on which coils for the folded module 1100 are mounted and a board on which coils for the lens module 1200 are mounted from each other.

Figure 14A:
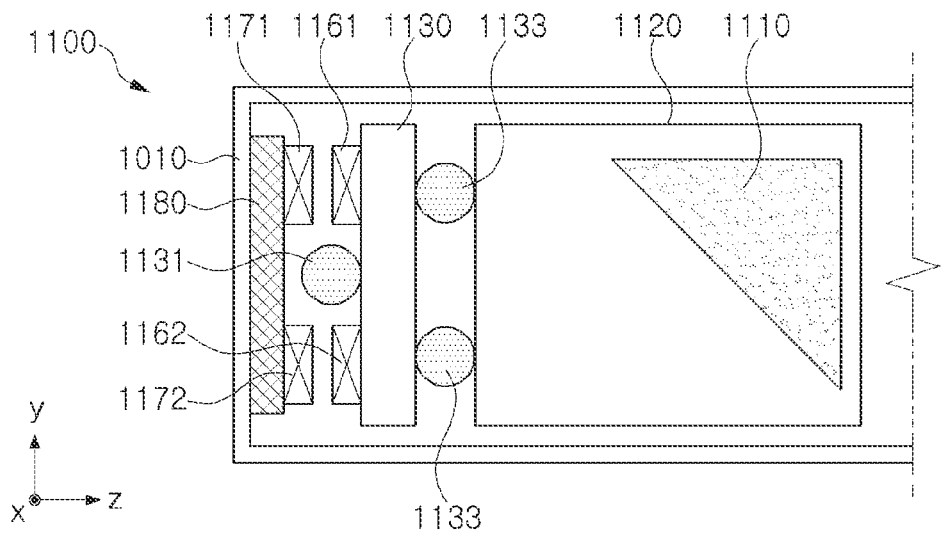
FIGS. 14A and 14B schematically illustrate a driving unit of a folded module according to one or more example embodiments.
Figure 14B:
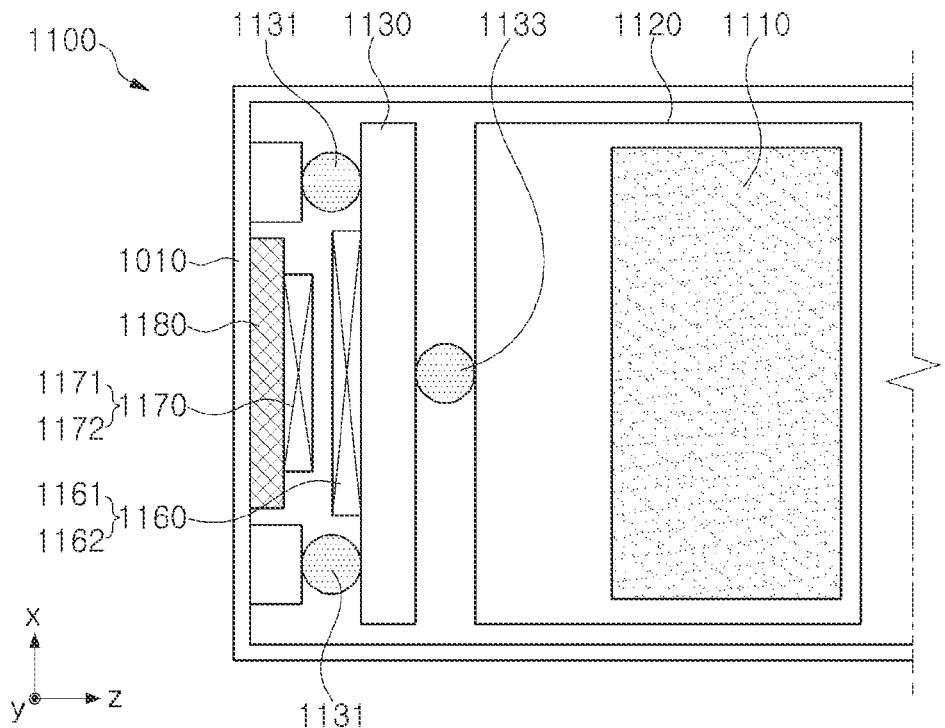
Figure 15A:
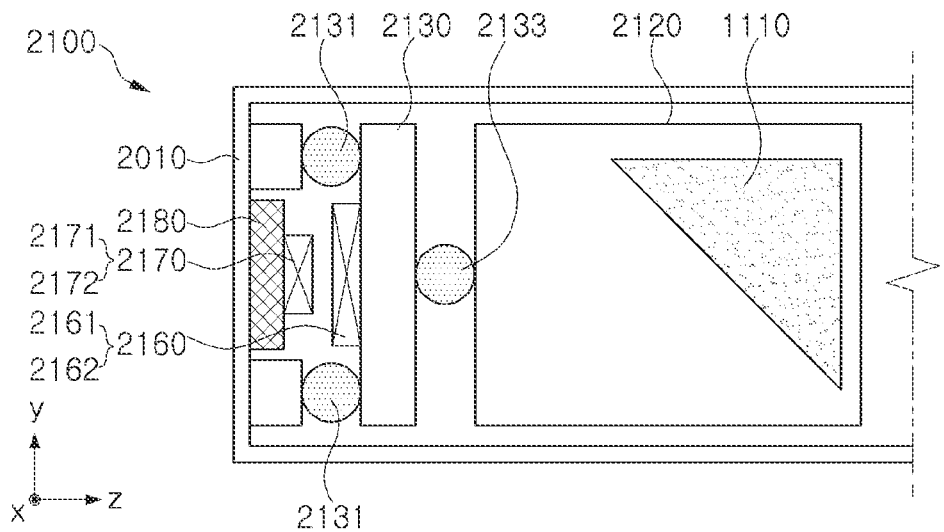
FIGS. 15A and 15B schematically illustrate a driving unit of a folded module in one or more example embodiments different from that of FIGS. 14A and 14B.
Figure 15B:
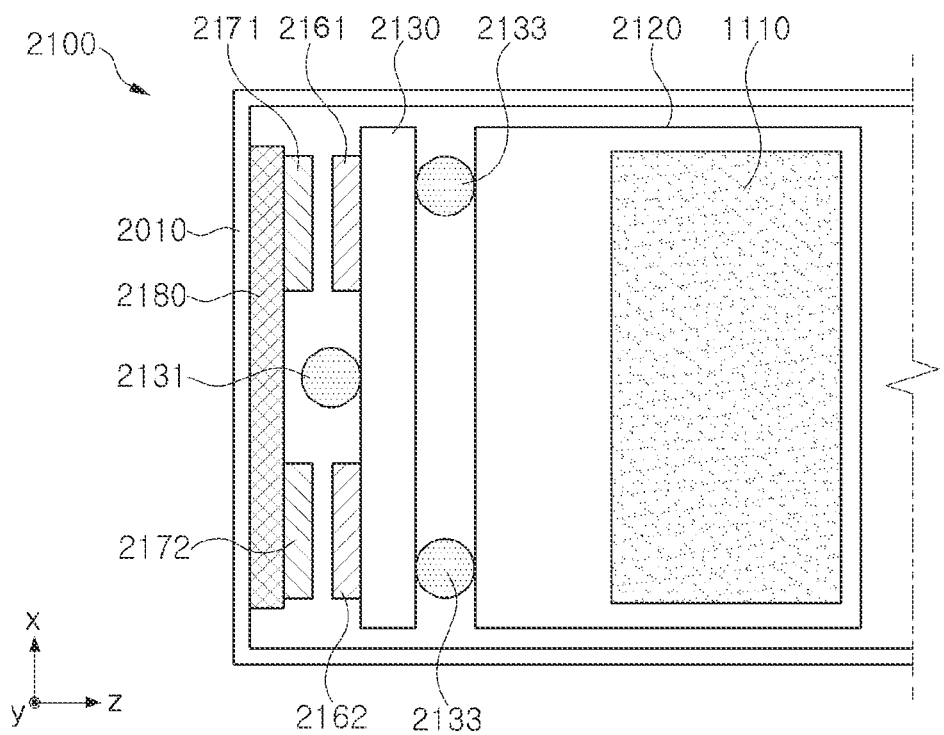

FIGS. 14A and 14B are views schematically illustrating a driving unit of the folded module 1100 according to one or more example embodiments. FIGS. 15A and 15B schematically illustrate a driving unit of a folded module 2100 in one or more example embodiments different from that of FIGS. 14A and 14B.

FIGS. 14A and 14B are views schematically illustrating the folded module 1100 illustrated in FIGS. 4 through 7 mainly on components of a driving unit. Components not illustrated in FIGS. 14A, 14B, 15A, and 15B are omitted for convenience of explanation, and the folded modules 1100 and 2100 illustrated in FIGS. 14A, 14B, 15A, and 15B may include some or all of the components included in the folded module 1100 illustrated in FIGS. 4 through 13.

Referring to FIGS. 14A and 14B, in an example embodiment, the rotating plate 1130 may rotate about the X axis with respect to the housing 1010, and the rotating holder 1120 may rotate about the Y axis with respect to the rotating plate 1130. The first ball members 1131 disposed between the rotating plate 1130 and the housing 1010 may be aligned in the X axis direction, and a rotation axis of the rotating plate 1130 with respect to the housing 1010 may be defined. The second ball members 1133 disposed between the rotating holder 1120 and the rotating plate 1130 may be aligned in the Y axis direction, and a rotation axis of the rotating holder 1120 with respect to the rotating plate 1130 may be defined. When the rotating plate 1130 rotates, the rotating holder 1120 attached to the rotating plate 1130 also rotates, and the rotating holder 1120 (or the reflective member 1110 seated on the rotating holder 1120) may thus rotate with respect to the housing 1010 about both the X axis and the Y axis.

Referring to FIGS. 15A and 15B, in an example embodiment, a rotating plate 2130 may rotate about the Y axis with respect to a housing 2010, and a rotating holder 2120 may rotate about the X axis with respect to the rotating plate 2130. First ball members 2131 disposed between the rotating plate 2130 and the housing 2010 may be aligned in the Y axis direction, and a rotation axis of the rotating plate 2130 with respect to the housing 2010 may be defined. Second ball members 2133 disposed between the rotating holder 2120 and the rotating plate 2130 may be aligned in the X axis direction, and a rotation axis of the rotating holder 2120 with respect to the rotating plate 2130 may be defined. When the rotating plate 2130 rotates, the rotating holder 2120 attached to the rotating plate 2130 also rotates, and the rotating holder 2120 (or the reflective member 1110 seated on the rotating holder 2120) may thus rotate with respect to the housing 2010 about both the X axis and the Y axis.

Referring to FIGS. 14A and 14B, in an example embodiment, the first magnet 1161 and the second magnet 1162 may be disposed opposite to each other with respect to the rotation axis of the housing 1010 of the rotating plate 1130 (or the first ball members 1131 defining the rotation axis). The rotating plate 1130 may rotate with respect to the housing 1010 about the rotation axis parallel to the X axis and passing through the first ball member 1131. Therefore, in an example embodiment, the first magnet 1161 and the second magnet 1162 may be provided on the rotating plate 1130 so as to be aligned in the Y axis direction. For example, the first magnet 1161 may be positioned in the +Y direction of the rotation axis passing through the two first ball members 1131, and the second magnet 1162 may be positioned in the −Y direction of the rotation axis. In an example embodiment, since the first coil 1171 and the second coil 1172 are provided in the housing 1010 to face the first magnet 1161 and the second magnet 1162, respectively, the coils 1170 may also be aligned in the Y axis direction. In an example embodiment in which one coil 1170a is provided in the housing 1010 instead of the first coil 1171 and the second coil 1172 as in the example embodiment of FIG. 8, one side and the other side of the coil 1170a may be disposed to face the first magnet 1161 and the second magnet 1162, respectively.

Referring to FIGS. 15A and 15B, in an example embodiment, a first magnet 2161 and a second magnet 2162 may be disposed opposite to each other with respect to the rotation axis of the housing 2010 of the rotating plate 2130 (or the first ball members 2131 defining the rotation axis). The rotating plate 2130 may rotate with respect to the housing 2010 about the rotation axis parallel to the Y axis and passing through the first ball members 2131. Therefore, in an example embodiment, the first magnet 2161 and the second magnet 2162 may be provided on the rotating plate 2130 so as to be aligned in the X axis direction. For example, the first magnet 2161 may be positioned in the +X direction of the rotation axis passing through the two first ball members 2131, and the second magnet 2162 may be positioned in the −X direction of the rotation axis. In an example embodiment, since the first coil 2171 and the second coil 2172 are provided in the housing 2010 to face the first magnet 2161 and the second magnet 2162, respectively, the coils may also be aligned in the X axis direction. In an example embodiment in which one coil 1170a is provided in the housing 2010 instead of the first coil 2171 and the second coil 2172 as in the example embodiment of FIG. 8, one side and the other side of the coil 1170a may be disposed to face the first magnet 2161 and the second magnet 2162, respectively.

Referring to FIGS. 14A, 14B, 15A, and 15B, the magnets 1160 and 2160 of the driving unit may provide magnetic attraction (or pulling force) so that the folded modules 1100 and 2100 may be supported by the housings 1010 and 2010. Magnetic attraction may arise between the magnets 1160 and 2160 and the second pulling yokes 1180 and 2180, and the folded modules 1100 and 2100 may be closely supported on the inner surfaces of the housings 1010 and 2010 by the magnetic attraction. That is, the magnets 1160 and 2160 used to drive the OIS may function as the pulling magnet 1151.

Figure 16:
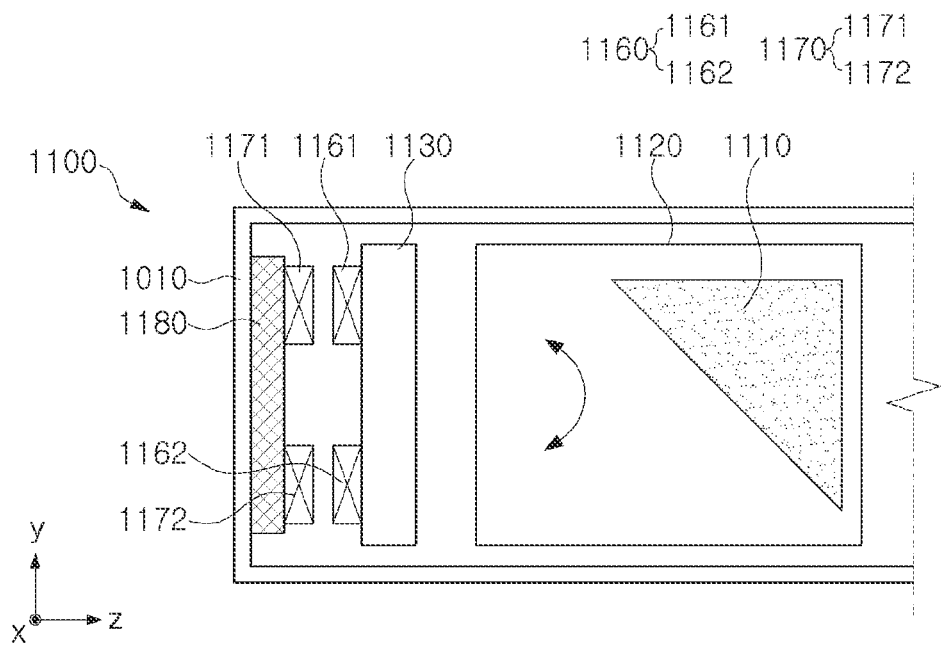
FIG. 16 schematically illustrates an arrangement of a driving coil and a driving magnet in a folded module according to one or more example embodiments.
Figure 17:
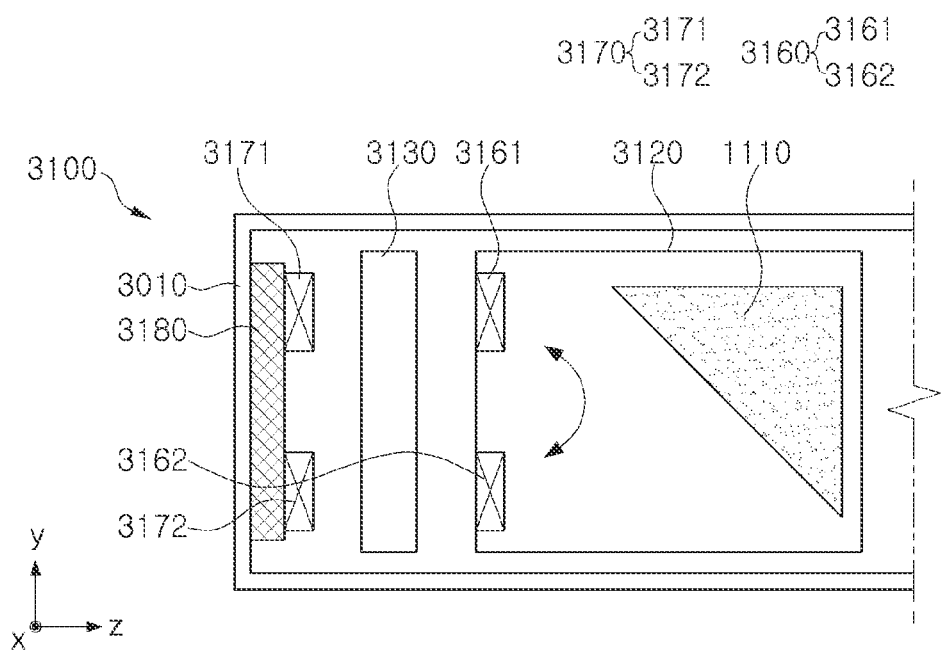
FIGS. 17 and 18 schematically illustrate an arrangement of a driving coil and a driving magnet in one or more example embodiments different from that of FIG. 16.
Figure 18:
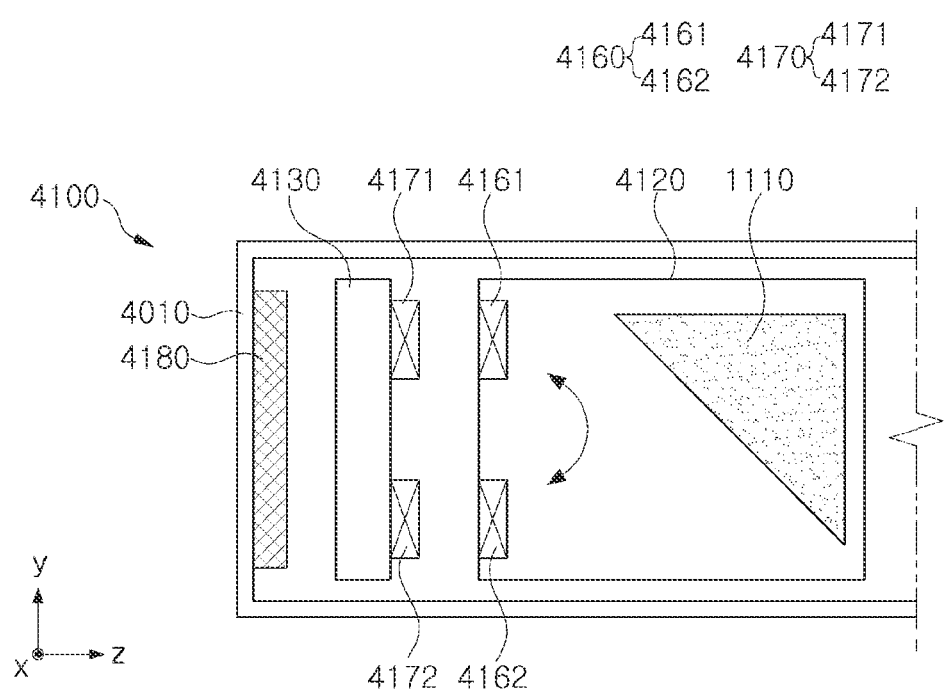

FIG. 16 schematically illustrates an arrangement of a driving coil and a driving magnet in the folded module 1100 according to one or more example embodiments. FIGS. 17 and 18 schematically illustrate an arrangement of a driving coil and a driving magnet in one or more example embodiments different from that of FIG. 16.

FIG. 16 is a view schematically illustrating the folded module 1100 illustrated in FIGS. 4 through 7 mainly on components of a driving unit. Components not illustrated in FIGS. 16 through 18 are omitted for convenience of explanation, and the folded modules 1100, 3100, and 4100 illustrated in FIGS. 16 through 18 may include some or all of the components included in the folded module 1100 described in FIGS. 4 through 13.

Referring to FIG. 16, in an example embodiment, the coil 1170 may be provided in the housing 1010, and the magnet 1160 may be provided in the rotating plate 1130. In an example embodiment, the pulling yoke 1180 may be provided on the inner surface of the housing 1010, and the coil 1170 may be disposed on the pulling yoke 1180. The coil 1170 and the magnet 1160 may be disposed to face each other, and the rotating holder 1120 may rotate by electromagnetic interaction between the coil 1170 and the magnet 1160.

Referring to FIG. 17, in an example embodiment, the magnet 3160 may be provided on the rotating holder 3120 instead of the rotating plate 3130. Even if there is a rotating plate 3130 between the coil 3170 and the magnet 3160, electromagnetic force may be generated between the coil 3170 and the magnet 3160, which may rotate the rotating holder 3120 with respect to the housing 3010. In an example embodiment, the first magnet 3161 and the second magnet 3162 are provided in the rotating holder 3120, and may be disposed to face the first coil 3171 and the second coil 3172 provided in the housing 3010, respectively. The magnetic attraction between the magnets 3160 provided in the rotating holder 3120 and a pulling yoke 3180 may contribute to the rotating holder 3120 being supported by the housing 3010.

Referring to FIG. 18, in an example embodiment, a magnet 4160 may be provided in a rotating holder 4120 instead of a rotating plate 4130, and a coil 4170 may be provided in the rotating plate 4130 instead of a housing 4010. In an example embodiment, a first magnet 4161 and a second magnet 4162 are provided in the rotating holder 4120, and may be disposed to face a first coil 4171 and a second coil 4172 provided in the rotating plate 4130, respectively. Like the example embodiment of FIG. 17, magnetic attraction between the magnets 4160 provided in the rotating holder 4120 and the pulling yoke 4180 may contribute to the rotating holder 4120 being supported by the housing 4010.

In FIGS. 17 and 18, the ball members disposed between the housings 3010 and 4010, the rotating plates 3130 and 4130, and the rotating holders 3120 and 4120 are not illustrated, but the ball members may be arranged similarly to the example embodiments illustrated in FIGS. 14A, 14B, 15A, and 15B.

In the example embodiment of FIG. 17, the ball members may be disposed similarly to the ball members 1131 and 1133 illustrated in FIGS. 14A and 14B. For example, the first ball members 1131 may be disposed between the housing 3010 and the rotating plate 3130 to be aligned in a direction parallel to the X axis, and the second ball members 1133 may be disposed between the rotating plate 3130 and the rotating holder 3120 to be aligned in a direction parallel to the Y axis.

In the example embodiment of FIG. 18, the ball members may be disposed similarly to the ball members 2131 and 2133 illustrated in FIGS. 15A and 15B. For example, the first ball members 2131 may be disposed between the housing 4010 and the rotating plate 4130 to be aligned in a direction parallel to the Y axis, and the second ball members 2133 may be disposed between the rotating plate 4130 and the rotating holder 4120 to be aligned in a direction parallel to the X axis.

Meanwhile, unlike the example embodiments illustrated in the present disclosure, the reflective member 1110 may rotate with a single axis with respect to the housings 1010, 2010, 3010, and 4010. In an example embodiment, the rotating holders 1120, 2120, 3120, and 4120 in the folded modules 1100, 2100, 3100, and 4100 may be rotatably coupled to the housings 1010, 2010, 3010, and 4010 with respect to the X axis or the Y axis. For example, in the illustrated example embodiments, the rotating plates 1130, 2130, 3130, and 4130 may be omitted, and the OIS driving magnets 1160, 2160, 3160, and 4160 may be directly provided on the rotating holders 1120, 2120, 3120, and 4120.

Meanwhile, in the present disclosure, in the coil-magnet set that generates the driving force, it is sufficient if the coil and the magnet are provided on different components, respectively, and the positions where the coil and the magnet are provided are not limited to the illustrated example embodiments. That is, in the present disclosure, the coils 1141b, 1143b, 1170, 1170a, 2170, 3170, and 4170 are provided on the housings 1010, 2010, 3010, and 4010, and the magnets 1141a, 1143a, 1160, 2160, 3160, and 4160 are provided on the rotating holders 1120, 2120, 3120, and 4120, or the rotating plates 1130, 2130, 3130, and 4130, but the example embodiments of the present disclosure are not limited thereto.

For example, in the example embodiment illustrated in FIG. 5, the first coil 1171 may be provided on the rotating plate 1130 and the first magnet 1161 may be provided on the housing 1010. In addition, the second coil 1172 may be provided on the rotating plate 1130 and the second magnet 1162 may be provided on the housing 1010.

As another example, in the example embodiment illustrated in FIG. 8, the coil 1170a may be provided on the rotating plate 1130 and the OIS driving magnets 1160 may be provided on the housing 1010. In this case, an additional pulling magnet-pulling yoke set capable of supporting the rotating holder 1120 on the housing 1010 may be provided in the folded module 1100.

As another example, in the folded module 3100 or 4100 illustrated in FIG. 17 or 18, the positions of the coils 3170 and 4170 and the magnets 3160 and 4160 may be interchanged. In the example embodiment of FIG. 17, the coils 3170 may be provided on the rotating holder 3120, and the magnets 3160 may be provided on the housing 3010. In this case, an additional pulling magnet-pulling yoke set capable of supporting the rotating holder 3120 on the housing 3010 may be provided in the folded module 3100. In the example embodiment of FIG. 18, the coils 4170 may be provided on the rotating holder 4120, and the magnets 4160 may be provided on the rotating plate 4130. In this case, an additional pulling magnet-pulling yoke set capable of supporting the rotating holder 4120 on the housing 4010 may be provided in the folded module 4100.

In the present disclosure, the magnets 1160, 1141a, 1143a, 1160, 1241a, 1243a, 2160, 3160, and 4160 and the coils 1141b, 1143b, 1170, 1170a, 1241b, 1243b, 2170, 3170, and 4170 used for driving the OIS or the AF described in FIGS. 4 through 18 may all be referred to as driving elements. In an example embodiment, a first driving element may be provided in the housings 1010, 2010, 3010, and 4010, and a second driving element may be provided in the rotating plates 1130, 2130, 3130, and 4130, the rotating holders 1120, 2120, 3120, and 4120, or the lens module 1200. In an example embodiment, the first driving element may be a coil and the second driving element may be a magnet. In another example embodiment, the first driving element may be a magnet and the second driving element may be a coil.

According to the example embodiments of the present disclosure, since the driving unit of the folded module is not disposed in the thickness direction of the folded module, but is disposed in the optical axis direction (i.e., the Z axis direction), the thickness of the folded module (length in the Y axis direction) is reduced, and the thickness of the camera module or the electronic device employing the folded module may be thus reduced.

Meanwhile, in the electronic device having a comparative folded module, a magnetic member may be disposed in a portion of the folded module close to the OIS driving unit. In this case, an OIS function may not be smoothly performed due to interaction between the magnetic member and the OIS driving unit. Therefore, it is advantageous that the OIS driving unit is disposed at a position that may avoid interference with the magnetic member and which may be disposed around the folded module as much as possible. In particular, in many cases, the magnetic member is disposed under the folded module. For example, an MMP film or the like may be disposed under the folded module. In the folded module according to the example embodiments of the present disclosure, since the driving elements are disposed on the side surface of the folded module, a negative influence that the magnetic member may have on the driving of the folded module may be significantly reduced or prevented.

Meanwhile, the electronic device including the camera module may include a display disposed under the folded module. The display may include an electromagnetic field induction type digitizer. The digitizer may include a pen that generates an electromagnetic field and a substrate that detects a magnetic field, and may work by an electromagnetic field induction method. As a position of the pen that generates the electromagnetic field moves, a change in the electromagnetic field caused by interaction with the substrate may be detected. However, when a magnet or coil is disposed on a rear surface of the display, the electromagnetic field of the digitizer may be affected, and the position of the pen may be thus incorrectly recognized.

According to the example embodiments of the present disclosure, the driving elements (coils and magnets) provided in the folded module may be disposed on the side surface of the folded module. Therefore, the folded module according to the example embodiments of the present disclosure may significantly reduce or prevent a negative influence that the folded module may have on the digitizer.

As set forth above, according to example embodiments of the present disclosure, the thickness of the folded module may be reduced, which may contribute to miniaturization of the camera module and the electronic device employing the folded module.

According to the examples described herein, electromagnetic interference between the driving unit of the folded module and the magnetic member positioned around the driving unit may be prevented.

While specific example embodiments have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:
1. A folded module comprising:
a housing;
a reflecting unit supported on an inner surface of the housing by a magnetic attractive force and including a reflective member; and
a driving unit configured to provide driving force to rotate the reflecting unit with respect to the housing,
wherein the driving unit comprises:
a first magnet and a second magnet, spaced apart from each other, disposed on a surface of the reflecting unit to face the inner surface, and at least one coil disposed in the housing and facing the first magnet and/or the second magnet.

2. The folded module of claim 1, wherein the second magnet is positioned opposite to the first magnet about a rotation axis of the reflecting unit with respect to the housing.

3. The folded module of claim 1, wherein the at least one coil comprises a first coil facing the first magnet and a second coil facing the second magnet.

4. The folded module of claim 1, wherein the at least one coil comprises a coil facing both the first magnet and the second magnet.

5. The folded module of claim 1, further comprising a first magnetic member disposed on the housing, and a second magnetic member disposed on the reflecting unit and facing the first magnetic member,
wherein the magnetic attractive force acts between the first magnetic member and the second magnetic member.

6. The folded module of claim 5, wherein the second magnetic member includes the first magnet and/or the second magnet.

7. The folded module of claim 1, wherein a surface of the first magnet facing the at least one coil has a polarity opposite to a surface of the second magnet facing the at least one coil.

8. The folded module of claim 1, wherein the reflecting unit includes a rotating holder accommodating the reflective member, and a rotating plate disposed between the housing and the rotating holder, and
the first magnet and the second magnet are disposed on the rotating plate.

9. The folded module of claim 8, further comprising:
a third magnetic member disposed on the rotating holder; and
a fourth magnetic member disposed on the rotating plate,
wherein magnetic attraction arises between the third magnetic member and the fourth magnetic member.

10. A camera module comprising:
a camera housing having an inner space;
the folded module of claim 1 disposed in the inner space; and
a lens module aligned in an optical axis direction so that light reflected by the reflective member is incident, including at least one lens barrel having a plurality of lenses, and configured to allow the lens barrel to selectively move along an optical axis.

11. A folded module comprising:
a housing;
a reflecting unit supported on the housing by a magnetic attractive force and including a reflective member; and
a driving unit configured to provide driving force so that the reflecting unit moves with respect to the housing,
wherein the driving unit includes a first driving element disposed in the reflecting unit, and a second driving element disposed in the housing to face the first driving element, and wherein the first driving element and the second driving element are substantially opposite to each other in a direction in which light is reflected by the reflective member, and wherein the first driving element comprises a first magnet and a second magnet, spaced apart from each other, disposed on a surface of the reflecting unit.

12. The folded module of claim 11, wherein the second magnet is positioned opposite to the first magnet about a rotation axis of the reflecting unit with respect to the housing.

13. The folded module of claim 12, wherein the second driving element comprises a first coil facing the first magnet and a second coil facing the second magnet.

14. The folded module of claim 12, wherein the second driving element comprises a coil facing both the first magnet and the second magnet.

15. The folded module of claim 12, further comprising a magnetic member disposed on the housing, wherein the reflecting unit is supported on an inner surface of the housing by magnetic attraction arising between the magnetic member and the first driving element.

16. The folded module of claim 11, wherein the reflecting unit comprises a rotating holder accommodating the reflective member, and a rotating plate disposed between the housing and the rotating holder, and wherein the first driving element is disposed on the rotating plate.

17. A camera module comprising:

a camera housing comprising a cover disposed on the housing to cover an internal space;

the folded module of claim 11 disposed in the internal space to emit light incident through an opening in the cover; and a lens module comprising at least one lens barrel having a plurality of lenses aligned along an optical axis disposed so that the emitted light is incident thereto, wherein the lens barrel is configured to selectively move along the optical axis.

18. A camera module comprising:

a housing;

a reflective unit including a reflective member rotatable and configured to redirect incident light to an optical axis direction of lenses in a lens barrel;

a coil and a magnet disposed to face each other in the optical axis direction, wherein magnetic force generated between the coil and the magnet rotates the reflective member about a first rotation axis substantially perpendicular to the optical axis direction, wherein the reflective unit is supported on the housing by an attractive force acting in the optical axis direction, and wherein the magnet comprises two magnets, spaced apart from each other, disposed on a same surface.

19. The camera module of claim 18, wherein the two magnets are disposed opposite to each other about the rotation axis.

20. A camera module comprising:

a reflective member rotatable and configured to redirect incident light to an optical axis direction of lenses in a lens barrel;

a coil and a magnet disposed to face each other in the optical axis direction; and a rotating plate disposed between the reflective member and at least one of the coil and the magnet, wherein magnetic force generated between the coil and the magnet rotates the reflective member about a first rotation axis substantially perpendicular to the optical axis direction, and wherein the reflective member is rotatable relative to the rotating plate about a second rotation axis substantially perpendicular to the first rotation axis and the optical axis direction.

* * * * *